(12) United States Patent
Hara et al.

(10) Patent No.: US 11,198,483 B2
(45) Date of Patent: Dec. 14, 2021

(54) TWO FRONT WHEEL REVERSE STEERING LEANING VEHICLE

(71) Applicant: YAMAHA HATSUDOKI KABUSHIKI KAISHA, Iwata (JP)

(72) Inventors: Nobuo Hara, Iwata (JP); Yukihide Fukuhara, Iwata (JP); Tatsuya Nagata, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 138 days.

(21) Appl. No.: 16/570,563

(22) Filed: Sep. 13, 2019

(65) Prior Publication Data

US 2020/0017158 A1 Jan. 16, 2020

Related U.S. Application Data

(63) Continuation-in-part of application No. PCT/JP2018/010016, filed on Mar. 14, 2018.

(30) Foreign Application Priority Data

Mar. 14, 2017 (JP) .............................. JP2017-048505

(51) Int. Cl.
  *B62K 5/08* (2006.01)
  *B62D 5/04* (2006.01)
  (Continued)

(52) U.S. Cl.
  CPC .............. *B62K 5/08* (2013.01); *B62D 5/0457* (2013.01); *B62D 9/02* (2013.01); *B62D 9/04* (2013.01);
  (Continued)

(58) Field of Classification Search
  CPC ...... B62K 5/08; B62K 5/10; B62K 2005/001; B62K 5/05; B62D 9/04; B62D 5/0457; B62D 9/02; B62D 15/0235
  See application file for complete search history.

(56) References Cited

U.S. PATENT DOCUMENTS

| 4,351,410 A | 9/1982 | Townsend |
| 7,648,148 B1 * | 1/2010 | Mercier ................. B62K 5/027 280/124.103 |

(Continued)

FOREIGN PATENT DOCUMENTS

| EP | 3059150 A2 | 8/2016 |
| EP | 3115241 A2 | 1/2017 |

(Continued)

*Primary Examiner* — Darlene P Condra
(74) *Attorney, Agent, or Firm* — Rabin & Berdo, P.C.

(57) ABSTRACT

Flexibility in design of steering characteristics is enhanced in a leaning vehicle including two front steerable wheels. A vehicle includes a body frame, a left front wheel, a right front wheel, a rear wheel, a leaning mechanism, a steering mechanism, and a leaning-responsiveness-adjusting mechanism. The leaning mechanism includes arms rotatably supported by the body frame. The arms rotate with respect to the body frame so that the body frame leans. The steering mechanism mechanically transfers rotation of the handle to the left front wheel and the right front wheel. Accordingly, the body frame leans in the direction opposite to the rotation direction of the handle. The leaning-responsiveness-adjusting mechanism controls a motor by using an instruction value based on a time derivative value of a physical quantity generated by a motion of a rider affecting leaning of the body frame to thereby adjust responsiveness of leaning of the body frame.

10 Claims, 12 Drawing Sheets

(51) Int. Cl.
  *B62D 9/02* (2006.01)
  *B62D 15/02* (2006.01)
  *B62K 5/10* (2013.01)
  *B62D 9/04* (2006.01)
  *B62K 5/00* (2013.01)

(52) U.S. Cl.
  CPC ............ *B62D 15/0235* (2013.01); *B62K 5/10* (2013.01); *B62K 2005/001* (2013.01)

(56) References Cited

U.S. PATENT DOCUMENTS

| | | | |
|---|---|---|---|
| 7,802,800 B2* | 9/2010 | Melcher | B62K 5/01 |
| | | | 280/5.509 |
| 8,123,240 B2 | 2/2012 | Mercier | |
| 10,077,091 B2* | 9/2018 | Mercier | B60G 15/062 |
| 10,583,885 B2* | 3/2020 | Raffaelli | B62K 5/01 |
| 10,737,720 B2* | 8/2020 | Kanehara | B62K 5/027 |
| 10,894,571 B2* | 1/2021 | Kanehara | B62K 5/10 |
| 2005/0206101 A1* | 9/2005 | Bouton | B60G 21/007 |
| | | | 280/6.154 |
| 2007/0265746 A1 | 11/2007 | Fulks et al. | |
| 2008/0197597 A1* | 8/2008 | Moulene | B62D 21/183 |
| | | | 280/124.103 |
| 2008/0258415 A1* | 10/2008 | Melcher | B60G 7/006 |
| | | | 280/124.103 |
| 2009/0312908 A1 | 12/2009 | Van Den Brink | |
| 2010/0320023 A1* | 12/2010 | Rhodig | B62D 21/183 |
| | | | 180/400 |
| 2011/0006498 A1* | 1/2011 | Mercier | B62K 5/10 |
| | | | 280/124.103 |
| 2012/0119453 A1* | 5/2012 | Mercier | B60G 21/00 |
| | | | 280/5.51 |
| 2012/0181765 A1* | 7/2012 | Hill | B62K 5/027 |
| | | | 280/62 |
| 2012/0232758 A1 | 9/2012 | Mercier | |
| 2013/0297152 A1 | 11/2013 | Hayashi et al. | |
| 2014/0124286 A1 | 5/2014 | Hayashi | |
| 2015/0329165 A1* | 11/2015 | Page | B62K 21/20 |
| | | | 280/266 |
| 2016/0229251 A1 | 8/2016 | Mori | |
| 2016/0375948 A1 | 12/2016 | Takenaka et al. | |

FOREIGN PATENT DOCUMENTS

| | | |
|---|---|---|
| JP | S57-41278 A | 3/1982 |
| JP | 2009-536892 A | 10/2009 |
| JP | 2016-147540 A | 8/2016 |
| JP | 2017-007550 A | 1/2017 |
| WO | 2011/005945 A1 | 1/2011 |

* cited by examiner

TWO FRONT WHEEL REVERSE STEERING LEANING VEHICLE

CROSS-REFERENCES TO RELATED APPLICATIONS

The present application is a continuation-in-part application of International Application No. PCT/JP2018/010016, filed on Mar. 14, 2018, and having the benefit of the earlier filing date of Japanese Application No. 2017-048505, filed on Mar. 14, 2017. The content of each of the identified applications is incorporated herein by reference in its entirety.

BACKGROUND

Technical Field

The present teaching relates to a two front wheel reverse steering leaning vehicle including two front wheels that are steerable wheels and capable of leaning a body frame in a turning direction by reverse steering of the two front wheels.

Background Art

A known leaning vehicle turns by leaning a body frame in a turning direction. Such a leaning vehicle includes two front wheels disposed at the left and right, and a leaning mechanism disposed between the two front wheels and the body frame.

For example, a vehicle disclosed in WO2011/005945 (Patent Document 1) includes a body frame supporting an engine and a shock tower rotatably attached to the body frame. A left front wheel and a right front wheel are respectively disposed at the left and right of a rotation axis of the shock tower. A suspension of the left front wheel and a suspension of the right front wheel are connected to one end of the shock tower. The vehicle also includes an actuator for adjusting rotation of the shock tower with respect to the body frame. The actuator applies a torque to the shock tower such that the body frame is set in an upright position when the vehicle speed decreases below a threshold with the body frame leaned. Accordingly, the body frame can be easily maintained at the upright position while the vehicle is traveling at low speed. That is, a vehicle to be easily handled by a rider can be provided.

CITATION LIST

Patent Document

Patent Document 1: WO2011/005945

In a leaning vehicle including two front wheels as steerable wheels (two front wheel leaning vehicle), Gyroscopic Precession of the wheels tends to be large. Thus, in the two front wheel leaning vehicle, Gyroscopic Precession significantly affects steering characteristics. The steering characteristics here include a straight-traveling characteristic and a leaning characteristic. The straight-traveling characteristic is a parameter for easiness in maintaining a straight-traveling state of the vehicle. The leaning characteristic is a parameter of easiness in leaning of the body frame. The steering characteristics of the leaning vehicle are adjusted by design of a caster angle and a trail. In the two front wheel leaning vehicle, however, since the two front wheels move together with a leaning mechanism, design of the caster angle and trail is greatly restricted. Thus, it is difficult to manufacture a two front wheel leaning vehicle showing desired steering characteristics.

As disclosed in WO2011/005945 described above, in the case of providing an actuator in a vehicle, conditions for restricting design of a caster angle and a trail increase. Consequently, it becomes more difficult to manufacture a two front wheel leaning vehicle showing desired steering characteristics.

SUMMARY OF THE INVENTION

In view of the foregoing, the present teaching has an object of enhancing design flexibility in steering characteristics in a leaning vehicle including two front wheels as steerable wheels.

Inventors of the present teaching intensively studied steering characteristics of a leaning vehicle including two front wheels (front wheels) that are steerable wheels. It is known that a balance between a straight-traveling characteristic and a leaning characteristic affects the steering characteristics. A conceivable method for keeping a balance between the straight-traveling characteristic and the leaning characteristic is a method of appropriately setting the caster angle and the trail. The caster angle and the trail are mainly determined by design of two front wheels and a leaning mechanism disposed between the two front wheels and a body frame. The two front wheels and the leaning mechanism, however, need to be disposed as components of a vehicle. In addition, the two front wheels and the leaning mechanism move relative to the body frame. Thus, it is necessary to avoid an interference of the two front wheels and the leaning mechanism with other parts. This is a cause of restricting the design of the two front wheels and the leaning mechanism. As described above, the factor of restricting the two front wheels and the leaning mechanism is a cause of restricting design of the caster angle and the trail. Consequently, it becomes more difficult to design steering characteristics in consideration of a balance between the straight-traveling characteristic and the leaning characteristic.

In a case where a vehicle includes an actuator for controlling leaning of a body frame, an actuator mechanism is coupled to the leaning mechanism. The actuator mechanism includes an actuator and a speed reducer. The actuator mechanism is connected to both the leaning mechanism and the body frame. In leaning the body frame, a part of the actuator mechanism also leans together with the body frame. Accordingly, the actuator mechanism affects a leaning characteristic of the vehicle. In the case of including the actuator as described above, it becomes much more difficult to design steering characteristics in consideration of a balance between the straight-traveling characteristic and the leaning characteristic.

In view of the foregoing, inventors of the present teaching have studied adjustment of a leaning characteristic by using elements except for a caster angle and a trail. In the two front wheel leaning vehicle, a rider can perform reverse steering. The reverse steering is an operation of leaning a body frame in a turning direction by steering two front wheels in a direction opposite to a direction in which the vehicle is turning, at an initial stage of the turning operation. The inventors found that in a vehicle enabling reverse steering, a temporal shift between a motion of a rider and reaction of the vehicle significantly affects steering characteristics of the vehicle. The inventors found that steering characteristics of the vehicle are affected by, for example, a temporal shift in response of the vehicle when a rider leans the vehicle from a straight-traveling state, a temporal shift in response of the vehicle in switching from rightward leaning to leftward leaning, and a temporal shift in response of the vehicle in switching from leftward leaning to rightward leaning.

Based on these findings, the inventors conceived of providing the vehicle with a unit for adjusting responsiveness of leaning of the vehicle with respect to an operation for leaning the vehicle by a rider. This unit enables adjustment of a leaning characteristic without using a caster angle and a trail.

Specifically, the inventors have arrived at an idea of providing a leaning-responsiveness-adjusting mechanism that adjusts responsiveness of leaning by controlling a leaning mechanism supporting two front wheels as steerable wheels with a motor in accordance with a change in rider's motion. The leaning-responsiveness-adjusting mechanism is capable of adjusting responsiveness of leaning. Thus, a leaning characteristic that cannot be adjusted by using a caster angle and a trail can be adjusted by the leaning-responsiveness-adjusting mechanism. Consequently, flexibility in designing steering characteristics can be enhanced.

A two front wheel reverse steering leaning vehicle according to an embodiment of the present teaching includes a body frame, a left front wheel, a right front wheel, a rear wheel, a leaning mechanism, a reverse steering mechanism, and a leaning-responsiveness-adjusting mechanism. The body frame leans in a left direction with respect to a top-bottom direction of the vehicle when the vehicle turns leftward and leans in a right direction with respect to the top-bottom direction of the vehicle when the vehicle turns rightward. The left front wheel and the right front wheel are disposed along a left-right direction of the vehicle. The rear wheel is disposed behind the left front wheel and the right front wheel in the vehicle and supported by the body frame. The leaning mechanism includes an arm rotatably supported by the body frame and steerably supporting the left front wheel and the right front wheel, and the arm is configured to rotate with respect to the body frame so that relative positions of the left front wheel and the right front wheel in a top-bottom direction of the body frame are changed and the body frame is leaned in the left direction or in the right direction. The reverse steering mechanism includes a handlebar rotatably supported by the body frame and operable by a rider, and the reverse steering mechanism is configured to lean the body frame in the right direction with respect to the top-bottom direction of the vehicle by mechanically transferring leftward rotation of the handle to steer the left front wheel and the right front wheel leftward, and configured to lean the body frame in the left direction with respect to the top-bottom direction of the vehicle by mechanically transferring rightward rotation of the handle to steer the left front wheel and the right front wheel rightward. The leaning-responsiveness-adjusting mechanism includes a motor that is connected to the body frame and the arm and applies, to the arm steerably supporting the left front wheel and the right front wheel, a torque in a direction in which the arm rotates with respect to the body frame, and the leaning-responsiveness-adjusting mechanism is configured to control the motor by using an instruction value based on a time derivative value of a physical quantity generated by a motion of the rider affecting leaning of the body frame to thereby adjust responsiveness of leaning of the body frame (first configuration).

In the first configuration, the two front wheel reverse steering leaning vehicle includes the leaning mechanism including the arm steerably supporting the right front wheel and the left front wheel. The arm is rotatably supported by the body frame. Rotation of the arm changes the relative positions of the left front wheel and the right front wheel in the top-bottom direction of the body frame. The leaning mechanism enables the top-bottom direction of the body frame to lean relative to the top-bottom direction of the vehicle. The reverse steering mechanism mechanically transfers rotation of the handle to the left front wheel and the right front wheel. The leaning mechanism and the reverse steering mechanism enable reverse steering in which the body frame leans in the direction opposite to the steering direction of the handle.

The leaning vehicle enabling reverse steering as described above includes the motor that applies, to the arm steerably supporting the left front wheel and the right front wheel, a torque in a direction in which the arm rotates with respect to the body frame. The motor is controlled by using the instruction value based on the time derivative value of the physical quantity generated by a motion of the rider affecting leaning of the body frame. That is, a torque with which the body frame leans is adjusted based on a change with time in physical quantity generated by a motion of the rider affecting leaning of the body frame. Accordingly, leaning of the body frame can be adjusted with the motor in accordance with a change with time in a motion of the rider concerning leaning. Consequently, a shift between an intension of the rider and reaction of the vehicle in terms of time can be adjusted. That is, responsiveness of leaning can be adjusted. Thus, a leaning characteristic that cannot be sufficiently adjusted by using a caster angle and a trail can be adjusted by the leaning-responsiveness-adjusting mechanism. As a result, flexibility in designing steering characteristics in the two front wheel reverse steering leaning vehicle can be enhanced.

In the first configuration, the leaning-responsiveness-adjusting mechanism may adjust responsiveness of leaning of the body frame by supplying the motor with an instruction value for changing the torque to be applied to the arm in accordance with the time derivative value of the physical quantity (second configuration).

In this second configuration, the torque to be applied to the arm by the motor changes in accordance with the change with time of the physical quantity generated by a motion of the rider affecting leaning. Accordingly, the change with time of a motion of the rider affecting leaning is reflected in lean control of the body frame by a torque output by the motor. Consequently, responsiveness of leaning of the body frame with respect to a motion of the rider can be efficiently adjusted.

For example, the leaning-responsiveness-adjusting mechanism can control the motor by using one of an instruction value for increasing the torque by the motor as the change with time in the physical quantity increases, or an instruction value for decreasing the torque by the motor as the change with time in the physical quantity increases.

The instruction value for increasing the torque by the motor as the change with time of the physical quantity increases can be an instruction value for increasing a torque by the motor with which the body frame leans in the right direction with respect to the top-bottom direction of the vehicle as the change with time of the physical quantity caused by a motion of the rider of leaning the body frame in the right direction with respect to the top-bottom direction of the vehicle increases, and increasing a torque by the motor with which the body frame leans in the left direction with respect to the top-bottom direction of the vehicle as the change with time of the physical quantity caused by a motion of the rider that leans the body frame in the left direction with respect to the top-bottom direction of the vehicle increases, for example.

The instruction value for decreasing the torque by the motor as the change with time of the physical quantity increases can be an instruction value for decreasing a torque by the motor with which the body frame leans in the right direction with respect to the top-bottom direction of the vehicle as the change with time of the physical quantity caused by a motion of the rider of leaning the body frame in the right direction with respect to the top-bottom direction of the vehicle increases, and for decreasing a torque by the motor with which the body frame leans in the left direction with respect to the top-bottom direction of the vehicle as the change with time of the physical quantity caused by a motion of the rider that leans the body frame in the left direction with respect to the top-bottom direction of the vehicle increases.

Here, the aspect in which the torque by the motor with which the body frame leans in the right direction with respect to the top-bottom direction of the vehicle is decreased includes an aspect in which the torque by the motor with which the body frame leans in the left direction with respect to the top-bottom direction of the vehicle is increased. Similarly, the aspect in which the torque by the motor with which the body frame leans in the left direction with respect to the top-bottom direction of the vehicle is decreased includes an aspect in which a torque by the motor with which the body frame leans in the right direction with respect to the top-bottom direction of the vehicle is increased.

In the second configuration, the instruction value includes values indicating a direction and a magnitude of a torque applied by the motor. In this case, the direction and the magnitude of the torque are values in accordance with the time derivative value of the physical quantity generated by a motion of the rider affecting leaning of the body frame.

In the first configuration, the time derivative value of the physical quantity may be a time derivative value of a lean angle that is a rotation angle of the body frame about a vehicle front-rear axis extending in a front-rear direction of the vehicle. (third configuration).

With this configuration, a torque for leaning the body frame can be controlled based on a change with time of the lean angle of the body frame occurring with a motion of the rider. Accordingly, responsiveness of leaning in the two front wheel reverse steering leaning vehicle can be efficiently adjusted.

In the third configuration, the leaning-responsiveness-adjusting mechanism may control the motor by using an instruction value for increasing the torque in a direction identical to a direction in which the lean angle changes with respect to the top-bottom direction of the vehicle as the time derivative value of the lean angle increases. (fourth configuration).

With this configuration, when the amount of change in the lean angle caused by a motion of the rider per a unit time increases, a torque of the motor for leaning the body frame in a direction in which the rider is leaning the body frame increases. Thus, leaning trackability of the body frame can be enhanced for an operation of leaning the body frame by the rider. That is, it is possible to perform adjustment for enhancing a leaning characteristic of the two front wheel reverse steering leaning vehicle.

In the third configuration, the leaning-responsiveness-adjusting mechanism may control the motor by using an instruction value for decreasing the torque in a direction identical to a direction in which the lean angle changes with respect to the top-bottom direction of the vehicle as the time derivative value of the lean angle increases (fifth configuration).

With this configuration, when the amount of change in the lean angle caused by a motion of the rider per a unit time increases, a torque of the motor for leaning the body frame in the direction opposite to the direction in which the rider is leaning the body frame increases. Accordingly, a resistance force to a motion of leaning the body frame by the rider can be increased. That is, it is possible to perform adjustment for enhancing a straight-traveling characteristic of the two front wheel reverse steering leaning vehicle. The instruction value for decreasing the torque in the same direction as the direction in which the lean angle changes includes an instruction value for increasing the torque in the direction opposite to the direction in which the lean angle changes.

In the first configuration, the leaning-responsiveness-adjusting mechanism may determine the instruction value such that a relationship between the time derivative value of the physical quantity and a direction or a magnitude of the torque applied by the motor changes depending on a lean angle that is an angle formed by a difference between the top-bottom direction of the body frame and the top-bottom direction of the vehicle (sixth configuration).

Accordingly, responsiveness of leaning in causing leaning of the body frame to track or resist a leaning motion of the rider can be adjusted in accordance with the lean angle. Thus, the leaning characteristic and the straight-traveling characteristic can be more appropriately adjusted in accordance with a leaning state of the body frame.

In the first configuration, the leaning-responsiveness-adjusting mechanism may determine the instruction value such that a relationship between the time derivative value of the physical quantity and a direction or a magnitude of the torque applied by the motor changes depending on a vehicle speed (seventh configuration).

With this configuration, responsiveness of leaning in causing leaning of the body frame to track or resist a leaning motion of the rider can be adjusted in accordance with the vehicle speed. Thus, the leaning characteristic and the straight-traveling characteristic can be more appropriately adjusted in accordance with the vehicle speed.

The sixth configuration and the seventh configuration may be combined into a configuration in which the leaning-responsiveness-adjusting mechanism determines the instruction value such that a relationship between the time derivative value of the physical quantity and the direction or the magnitude of the torque applied by the motor changes in accordance with the lean angle and the vehicle speed. This configuration enables more appropriate adjustment of the leaning characteristic and the straight-traveling characteristic in accordance with the vehicle state.

In the first configuration, the leaning-responsiveness-adjusting mechanism may determine the instruction value by additionally using a second time derivative value of the physical quantity (eighth configuration).

As described above, the motor is controlled by using the instruction value based on the second time derivative value of the physical quantity generated by the motion of the rider so that it is possible to adjust responsiveness of leaning in consideration of an inertia component of a motion of leaning the body frame by the rider.

In the first configuration, the time derivative value of the physical quantity may include a time derivative value of a steering torque generated by an operation of the handle (ninth configuration). In the two front wheel leaning vehicle capable of performing reverse steering, a handle manipulation of a rider is greatly related to an intention of the rider of leaning the body frame. Accordingly, the motor is controlled by using the instruction value based on the time derivative value of the steering torque so that responsiveness of leaning of the body frame with respect to a leaning motion of the rider can be efficiently adjusted.

In the first configuration, the two front wheel reverse steering leaning vehicle may further include a lean angle sensor that detects a lean angle that is an angle formed by a difference between the top-bottom direction of the body frame and the top-bottom direction of the vehicle or detects a time derivative value of the lean angle. In this case, the leaning-responsiveness-adjusting mechanism can include an instruction value calculator that calculates the instruction value based on the time derivative value of the lean angle obtained from a detection result of the lean angle sensor (tenth configuration).

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, elements, components, and/or their equivalents but do not preclude the presence or addition of one or more other steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the present teaching.

In this specification, an embodiment of a two front wheel reverse steering leaning vehicle according to the present teaching will be described.

In the following description, numerous specific examples are set forth in order to provide a thorough understanding of the present teaching. It will be evident, however, to one skilled in the art that the present teaching may be practiced without these specific examples.

The present disclosure is to be considered as an exemplification of the present teaching, and is not intended to limit the present teaching to the specific embodiments illustrated by the figures or description below.

<Reverse Steering Mechanism>

A reverse steering mechanism is a steering mechanism that mechanically transfers rotation of a handle to a left front wheel and a right front wheel. As an example, the reverse steering mechanism can include the handle, and a steering force transfer mechanism that transfers rotation of the handle to the right front wheel and the left front wheel. The steering force transfer mechanism can be configured to include a steering shaft that is rotatably supported by a body frame and rotatable together with the handle; and a transfer member disposed between the steering shaft and the right front wheel and between the steering shaft and the left front wheel and movable in accordance with rotation of the steering shaft so that rotation of the steering shaft is transferred to the right front wheel and the left front wheel. The reverse steering mechanism does not include a configuration that converts a rotation torque of the handle to an electrical signal, and based on the converted electrical signal, controls leaning of a vehicle wheel or a body frame, that is, a configuration that does not mechanically transfer a rotation torque of the handle, such as steer-by-wire.

<Physical Quantity Generated by Motion of Rider>

A physical quantity generated by a motion of a rider can be a value representing a motion of a member which receives input by the rider, a force exerted on the member, a motion of the rider himself/herself, or a behavior of the vehicle resulting from these motions and force.

Examples of the physical quantity include a lean angle, a steering torque, an accelerator opening angle while the body frame is leaning in the left direction or in the right direction, a rear brake pressure, a front brake pressure, a stroke of a suspension, a pressure of the suspension, a load of a seat, a load of a step, a load of a knee grip, a value representing a posture of the rider detected by a camera or the like, and a combination of two or more of these parameters.

<Time Derivative Value of Physical Quantity>

A time derivative value of the physical quantity is a value indicating a change amount (change rate) of the physical quantity per a unit time. The time derivative value of the physical quantity may be a value obtained by differential operation of a detected physical quantity or a value detected as a change amount of physical quantity per a unit time (i.e., a value obtained through no operation). That is, the time derivative value of the physical quantity is not limited to a value obtained by differential operation. The motor may be controlled by using an instruction value based on time derivative values of a plurality of physical quantities.

An example of the time derivative value of the physical quantity for use in determination of the instruction value for the motor is a time derivative value of a lean angle. The lean angle can be a rotation angle of the body frame about a vehicle front-rear axis extending along a front-rear direction of the vehicle. The lean angle can also be referred to as a roll angle or a bank angle. The lean angle can be expressed by an angle formed by a top-bottom direction of the vehicle and a top-bottom direction of the body frame. A time derivative value of the lean angle is the amount of change in the lean angle per a unit time, and can be, for example, an angular velocity of the lean angle. Alternatively, the lean angle can be expressed as an angle formed by a vertical line extending in the vertical direction and an axis extending in the top-bottom direction of the body frame. The vertical direction coincides with the gravity direction.

The configuration for obtaining the lean angle or the time derivative value of the lean angle is not limited to a specific configuration. For example, the lean angle or the lean angle velocity can be obtained from an acceleration of the body frame detected by an inertial measurement unit (IMU). Alternatively, a time derivative value of the lean angle can be obtained by detecting the speed of rotation of the motor, rotation of a speed reducer, or rotation of an arm of the leaning mechanism with respect to the body frame, for example. Rotation of the arm with respect to the body frame can be detected by using, for example, a potentiometer. An IMU sensor, a motor rotation speed sensor, and the potentiometer are examples of a lean angle sensor.

<Responsiveness of Leaning>

Responsiveness of leaning includes, for example, a time from a motion of a rider affecting leaning of the body frame to leaning of the body frame, that is, trackability of leaning of the body frame with respect to a motion of the rider. That is, in a case where the time from a motion of the rider affecting leaning of the body frame to leaning of the body frame is short, for example, trackability of leaning of the body frame to the motion of the rider is high, and thus, responsiveness of leaning is high. On the other hand, in a case where the time from the motion of the rider affecting leaning of the body frame to leaning of the body frame is long, trackability of leaning of the body frame to the motion of the rider is low, and thus, responsiveness of leaning is low.

Advantages of Invention

A two front wheel reverse steering leaning vehicle according to one embodiment of the present teaching can enhance flexibility in designing steering characteristics.

DETAILED DESCRIPTION

Figure 1:
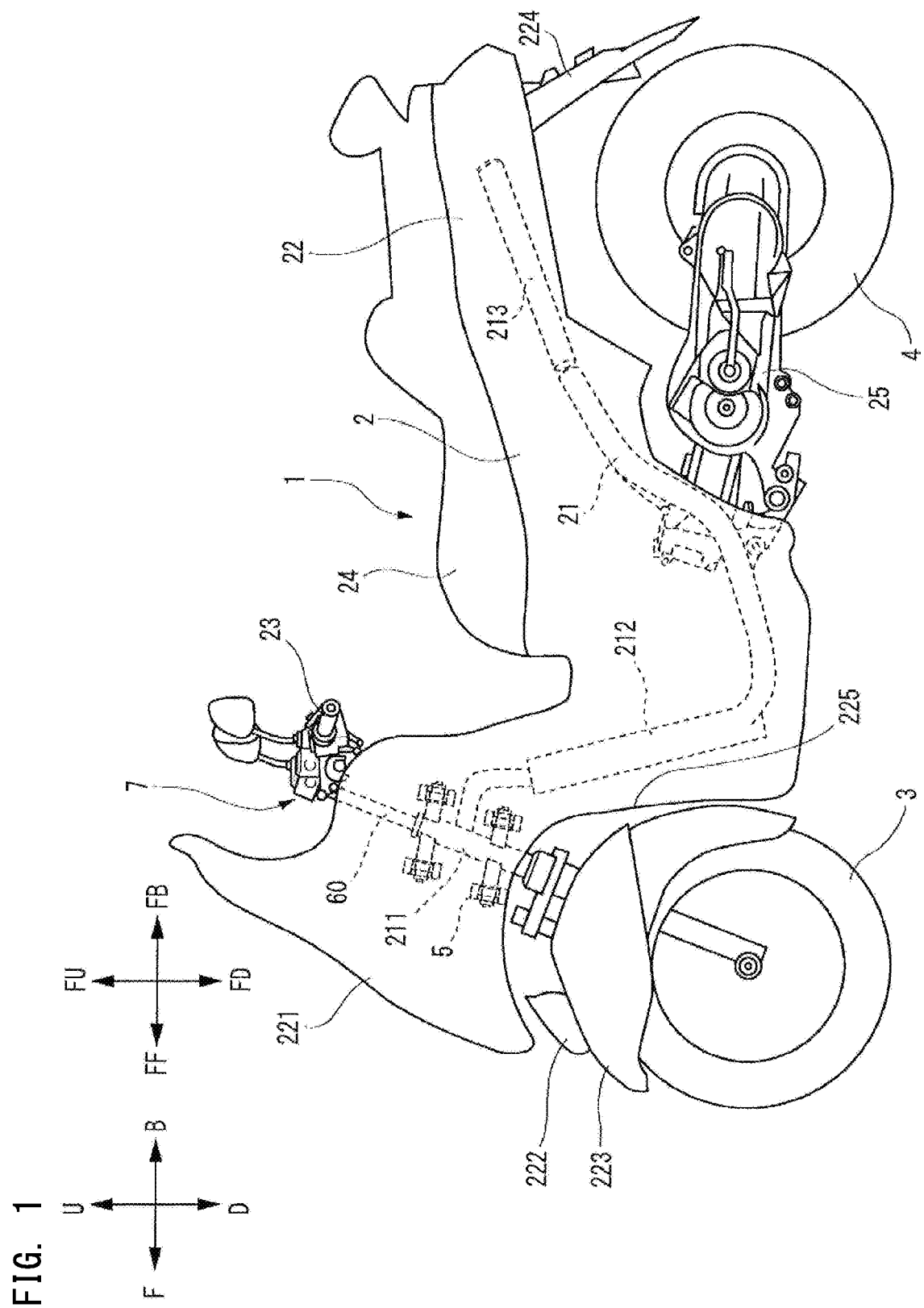
FIG. 1 is a left side view of an entire vehicle according to an embodiment when seen from the left.

An embodiment of the present teaching will be described in detail with reference to the drawings.

In the drawings, arrow F represents the forward direction of a vehicle. Arrow B represents the rearward direction of the vehicle. Arrow U represents the upward direction of the vehicle. Arrow D represents the downward direction of the vehicle. Arrow R represents the rightward direction of the vehicle. Arrow L represents the leftward direction of the vehicle.

The vehicle turns with a body frame being leaned in the left direction of the vehicle or in the right direction of the vehicle relative to the vertical direction. Thus, in the following description, in addition to the directions described above relative to the vehicle, directions relative to the body frame are also defined as follows. In the drawings, arrow FF represents the forward direction of the body frame. Arrow FB represents the rearward direction of the body frame. Arrow FU represents the upward direction of the body frame. Arrow FD represents the downward direction of the body frame. Arrow FR represents the rightward direction of the body frame. Arrow FL represents the leftward direction of the body frame.

The "front-rear direction of the body frame", the "left-right direction of the body frame", and the "top-bottom direction of the body frame" herein refer to the front-rear direction, the left-right direction, and the top-bottom direction, respectively, relative to the body frame when seen from a rider driving the vehicle. In addition, "to a side of the body frame" refers to the rightward or leftward direction of the body frame.

The expression "extending in the front-rear direction of the body frame" herein includes the state of extending in a direction with a lean relative to the front-rear direction of the body frame. In this case, a lean relative to the front-rear direction of the body frame is often smaller than leans of the body frame relative to the left-right direction and the top-bottom direction of the body frame.

The expression "extending in the left-right direction of the body frame" herein includes the state of extending in a direction with a lean relative to the left-right direction of the body frame. In this case, a lean relative to the left-right direction of the body frame is often smaller than leans of the body frame relative to the front-rear direction and the top-bottom direction of the body frame.

The expression "extending in the top-bottom direction of the body frame" herein includes the state of extending in a direction with a lean relative to the top-bottom direction of the body frame. In this case, a lean relative to the top-bottom direction of the body frame is often smaller than leans of the body frame relative to the front-rear direction and the left-right direction of the body frame.

The "upright position of the body frame" herein refers to a state where the top-bottom direction of the body frame coincides with the vertical direction. In this state, the directions relative to the vehicle coincide with the directions relative to the body frame. While the body frame is leaned in the left direction or in the right direction relative to the vertical direction, the left-right direction of the vehicle does not coincide with the left-right direction of the body frame. In this case, the top-bottom direction of the vehicle does not coincide with the top-bottom direction of the body frame, either. However, while the body frame is leaned in the left direction or in the right direction relative to the vertical direction, the front-rear direction of the vehicle coincides with the front-rear direction of the body frame.

In addition, "connection" herein includes electrical connection and a communicable state as well as physical connection. The physical connection includes, for example, a case where two members are directly connected to each other and a case where two members are indirectly connected to each other through another member.

(Vehicle Configuration)

FIG. 1 is a left side view of an entire vehicle 1 (two front wheel reverse steering leaning vehicle) when seen from the left. The vehicle 1 includes a vehicle body 2, a pair of left and right front wheels 3, a rear wheel 4, a leaning mechanism 5, and a steering mechanism 7.

The vehicle body 2 includes a body frame 21, a body cover 22, a seat 24, and a power unit 25. In FIG. 1, the body frame 21 is in an upright position. The following description with reference to FIG. 1 is based on a premise that the body frame 21 is in the upright position.

The body frame 21 includes a head pipe 211, a down frame 212, and a rear frame 213. In FIG. 1, a portion of the body frame 21 hidden by the body cover 22 is indicated by broken lines. The body frame 21 supports the seat 24 and the power unit 25. The power unit 25 supports the rear wheel 4. The power unit 25 includes a driving source such as an engine, an electric motor, or a battery, and a device such as a transmission.

The head pipe 211 is disposed in a front portion of the vehicle 1. When viewed from a side of the body frame 21, an upper portion of the head pipe 211 is disposed behind a lower portion of the head pipe 211.

The down frame 212 is connected to the head pipe 211. The down frame 212 is disposed behind the head pipe 211. The down frame 212 extends in the top-bottom direction of the body frame 21.

The rear frame 213 is disposed behind the down frame 212. The rear frame 213 extends in the front-rear direction of the body frame 21. The rear frame 213 supports the seat 24 and the power unit 25.

The body cover 22 includes a front cover 221, a front spoiler 222, a pair of left and right front fenders 223, a rear fender 224, and a leg shield 225. The body cover 22 is a part covering at least a portion of body parts mounted on the vehicle 1, such as the pair of left and right front wheels 3, the body frame 21, and the leaning mechanism 5.

Figure 2:
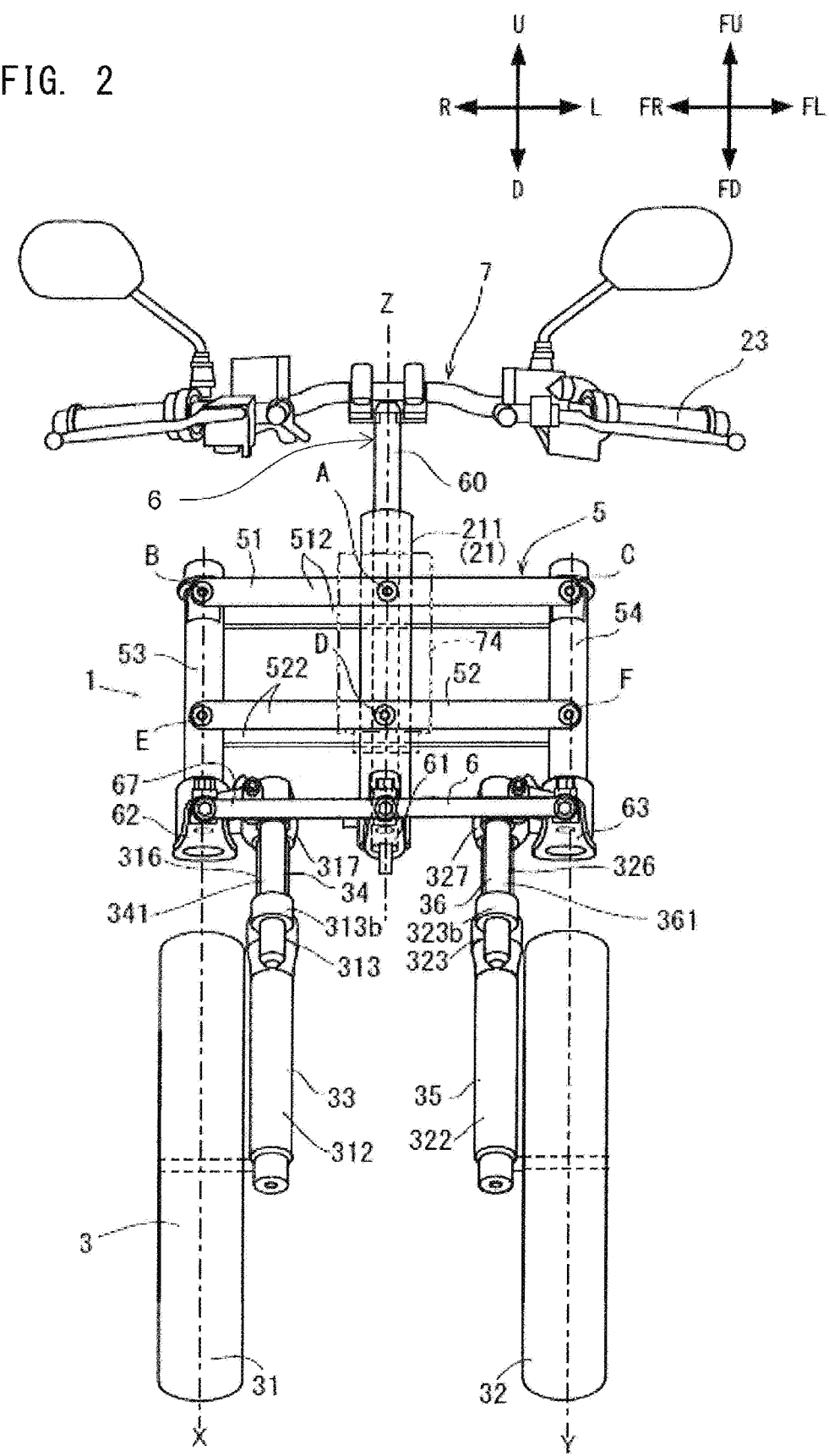
FIG. 2 is a front view of a part of the vehicle illustrated in FIG. 1 when seen from the front.

FIG. 2 is a front view of a front portion of the vehicle 1 when viewed from the front of the body frame 21. In FIG. 2, the body frame 21 is in an upright position. The following description with reference to FIG. 2 is based on a premise that the body frame 21 is in the upright position. FIG. 2 illustrates a state where the front cover 221, the front spoiler 222, and the pair of left- and right-front fenders 223 are detached in the vehicle 1.

The pair of front wheels 3 includes a right front wheel 31 and a left front wheel 32 arranged at the right and left of the head pipe 211 (body frame 21). The leaning mechanism 5 and suspensions (a right suspension 33 and a left suspension 35) are disposed between the head pipe 211 as a part of the body frame 21 and the pair of front wheels 3. That is, the body frame 21 is connected to the right front wheel 31 and the left front wheel 32 through the leaning mechanism 5 and the suspensions 33 and 35. The leaning mechanism 5 is disposed below the handle 23. The leaning mechanism 5 is disposed above the right front wheel 31 and the left front wheel 32.

<Leaning Mechanism>

The leaning mechanism 5 of the vehicle 1 illustrated in FIG. 2 is a leaning mechanism of a parallel four-bar linkage (also called parallelogram linkage) type. The leaning mechanism 5 includes an upper arm 51, a lower arm 52, a right side member 53, and a left side member 54.

The leaning mechanism 5 includes the upper arm 51 and the lower arm 52 (hereinafter collectively referred to as arms 51 and 52 when not specifically distinguished) rotatably supported by the body frame 21. The arms 51 and 52 are rotatable with respect to the body frame 21 about rotation axes extending in the front-rear direction of the body frame 21. The rotation axes are disposed at the centers of the arms 51 and 52 in the left-right direction. That is, intermediate portions of the arms 51 and 52 in the left-right direction are supported by the head pipe 211 on support parts A and D. The rotation axes of the arms 51 and 52 pass through the support parts A and D.

In the vehicle 1, when seen from above, the right front wheel 31 is disposed at the right of the rotation axis, and the left front wheel 32 is disposed at the left of the rotation axis. Specifically, the right front wheel 31 is connected to portions of the arms 51 and 52 at the right of the rotation axes through the right side member 53 and the right suspension 33. The left front wheel 32 is connected to portions of the arms 51 and 52 at the left of the rotation axes through the left side member 54 and the left suspension 35.

As described above, the right front wheel 31 is connected to the portions of the arms 51 and 52 at the right of the rotation axes and the left front wheel 32 is connected to the portions of the arms 51 and 52 at the left of the rotation axes so that relative positions of the right front wheel 31 and the left front wheel 32 relative to the body frame 21 in the top-bottom direction can be changed. That is, rotation of the arms 51 and 52 about the rotation axes changes the relative positions of the right front wheel 31 disposed at the right of the rotation axes and the left front wheel 32 disposed at the left of the rotation axes in the arms 51 and 52 in the top-bottom direction. When the relative positions of the right front wheel 31 and the left front wheel 32 relative to the body frame 21 in the top-bottom direction change, the body frame 21 leans in the left direction or in the right direction relative to the vertical direction. Accordingly, by adjusting the rotations of the arms 51 and 52 with respect to the body frame 21, a lean angle in the left direction or in the right direction of the body frame 21 can be controlled.

The upper arm 51 includes a pair of plate-shaped members 512. The pair of plate-shaped members 512 is disposed ahead of and behind the head pipe 211. Each of the plate-shaped members 512 extends in the left-right direction of the body frame 21. The lower arm 52 includes a pair of plate-shaped members 522. The pair of plate-shaped members 522 is disposed ahead of and behind the head pipe 211. Each of the plate-shaped members 522 extends in the left-right direction of the body frame 21. The lower arm 52 is disposed below the upper arm 51. The length of the lower arm 52 in the left-right direction is equal to or approximately equal to the length of the upper arm 51 in the left-right direction. The lower arm 52 extends in parallel with the upper arm 51.

The configurations of the arms 51 and 52 are not limited to the above example. In the example described above, the arms 51 and 52 respectively include the pair of plate-shaped members 512 and 522 disposed ahead of and behind the head pipe 211. Instead of this configuration, each of the arms 51 and 52 may be constituted by one plate-shaped member disposed ahead of the head pipe 211.

The right end of the upper arm 51 and the right end of the lower arm 52 are connected to the right side member 53 extending in the top-bottom direction of the body frame 21. The right side member 53 is supported by the upper arm 51 and the lower arm 52 to be rotatable about support parts B and E, respectively. The right side member 53 is rotatable about rotation axes passing through the support parts B and E and extending in the front-rear direction with respect to the upper arm 51 and the lower arm 52.

The left end of the upper arm 51 and the left end of the lower arm 52 are connected to the left side member 54 extending in the top-bottom direction of the body frame 21. The left side member 54 is supported by the upper arm 51 and the lower arm 52 to be rotatable about support parts C and F, respectively. The left side member 54 is rotatable about rotation axes passing through the support parts C and F and extending in the front-rear direction with respect to the upper arm 51 and the lower arm 52.

<Suspension>

The lower end of the right side member 53 is connected to the right suspension 33 through a right bracket 317. The lower end of the left side member 54 is connected to the left suspension 35 through a left bracket 327. The right suspension 33 and the left suspension 35 may extend and contract in the top-bottom direction of the body frame 21. The upper end of the right suspension 33 is connected to the leaning mechanism 5, and the lower end of the right suspension 33 is connected to the right front wheel 31. The upper end of the left suspension 35 is connected to the leaning mechanism 5, and the lower end of the left suspension 35 is connected to the left front wheel 32.

The suspensions 33 and 35 are telescopic suspensions, for example. The suspensions may also be referred to as buffers. The right suspension 33 includes a right outer cylinder 312 supporting the right front wheel 31 and a right inner cylinder 316 disposed in an upper portion of the right outer cylinder 312. The upper end of the right inner cylinder 316 is fixed to the right bracket 317, and the lower end of the right inner cylinder 316 is inserted in the right outer cylinder 312. When the right inner cylinder 316 moves relative to the right outer cylinder 312, the right suspension 33 extends and contracts. The left suspension 35 includes a left outer cylinder 322 supporting the left front wheel 32 and a left inner cylinder 326 disposed in an upper portion of the left outer cylinder 322. The upper end of the left inner cylinder 326 is fixed to the left bracket 327, and the lower end of the left inner cylinder 326 is inserted in the left outer cylinder 322. When the left inner cylinder 326 moves relative to the left outer cylinder 322, the left suspension 35 extends and contracts.

A right rotation prevention mechanism 34 is connected between the right bracket 317 and the right outer cylinder 312. The right rotation prevention mechanism 34 prevents the right outer cylinder 312 from rotating about an axis extending in the extension/contraction direction of the right suspension 33 with respect to the right inner cylinder 316. A left rotation prevention mechanism 36 is connected between the left bracket 327 and the left outer cylinder 322. The left rotation prevention mechanism 36 prevents the left outer cylinder 322 from rotating about an axis extending in the extension/contraction direction of the left suspension 35 with respect to the left inner cylinder 326.

Specifically, the right rotation prevention mechanism 34 includes a right rotation prevention rod 341, a right guide 313, and the right bracket 317. The right guide 313 is fixed to an upper portion of the right outer cylinder 312. The right guide 313 includes a right guide cylinder 313*b* in a front portion thereof.

The right rotation prevention rod 341 extends in parallel with the right inner cylinder 316. An upper portion of the right rotation prevention rod 341 is fixed to a front portion of the right bracket 317. The right rotation prevention rod 341 is disposed ahead of the right inner cylinder 316 with a part of the right rotation prevention rod 341 being inserted in the right guide cylinder 313*b*. Accordingly, the right rotation prevention rod 341 does not move relative to the right inner cylinder 316. With relative movement of the right inner cylinder 316 relative to the right outer cylinder 312 in the direction in which the right outer cylinder 312 extends, the right rotation prevention rod 341 also moves relative to the right guide cylinder 313*b*. Rotation of the right outer cylinder 312 about an axis extending in the extension/contraction direction of the right suspension 33 with respect to the right inner cylinder 316 is prevented.

The left rotation prevention mechanism 36 includes a left rotation prevention rod 361, a left guide 323, and the left bracket 327. The left guide 323 is fixed to an upper portion of the left outer cylinder 322. The left guide 323 is fixed to an upper portion of the left outer cylinder 322. The left guide 323 includes a left guide cylinder 323*b* in a front portion thereof.

The left rotation prevention rod 361 extends in parallel with the left inner cylinder 326. An upper portion of the left rotation prevention rod 361 is fixed to a front portion of the left bracket 327. The left rotation prevention rod 361 is disposed ahead of the left inner cylinder 326 with a part of the left rotation prevention rod 361 being inserted in the left guide cylinder 323*b*. Accordingly, the left rotation prevention rod 361 does not move relative to the left inner cylinder 326. With relative movement of the left inner cylinder 326 relative to the left outer cylinder 322 in the direction in which the left outer cylinder 322 extends, the left rotation prevention rod 361 also moves relative to the left guide cylinder 323*b*. Rotation of the left outer cylinder 322 about an axis extending in the extension/contraction direction of the left suspension 35 with respect to the left inner cylinder 326 is prevented.

The configuration of the suspensions is not limited to the above example. For example, the right suspension 33 may be configured such that two combinations of the right outer cylinder 312 and the right inner cylinder 316 that move relative to each other are arranged side by side. Similarly, the left suspension 35 may be also configured such that two combinations of the left outer cylinder 322 and the left inner cylinder 326 are arranged side by side. The suspensions having such a configuration are double telescopic suspensions. In this case, the pair of outer cylinders is connected not to move relative to each other and the pair of inner cylinders is connected not to move relative to each other so that the suspensions can also serve as a rotation prevention mechanism. Accordingly, the right rotation prevention mechanism 34 and the left rotation prevention mechanism 36 as described above are unnecessary.

<Leaning-Responsiveness-Adjusting Mechanism>

The vehicle 1 includes the leaning-responsiveness-adjusting mechanism 74 that adjusts responsiveness of leaning of the body frame 21 in the left direction or in the right direction. FIG. 2 shows the leaning-responsiveness-adjusting mechanism 74 by chain double-dashed lines. The leaning-responsiveness-adjusting mechanism 74 adjusts rotations of the arms 51 and 52 with respect to the body frame 21. The leaning-responsiveness-adjusting mechanism 74 applies a torque to the arms 51 and 52 in a direction in which the arms 51 and 52 rotate with respect to the body frame 21 so as to control responsiveness of leaning of the body frame 21 in the left direction or in the right direction. The leaning-responsiveness-adjusting mechanism 74 is connected to the body frame 21 and one of the upper arm 51 or the lower arm 52. The leaning-responsiveness-adjusting mechanism 74 is capable of applying, to the arms 51 and 52, a torque in the same direction as the rotation direction of the arms 51 and 52 and a torque in the direction opposite to the rotation direction of the arms 51 and 52.

The leaning-responsiveness-adjusting mechanism 74 includes a motor (not shown in FIG. 2) that applies, to the arms 51 and 52, a torque in the direction in which the arms 51 and 52 rotate. The leaning-responsiveness-adjusting mechanism 74 supplies an instruction value to the motor to thereby control a torque output by the motor. The leaning-responsiveness-adjusting mechanism 74 determines the instruction value to be supplied to the motor, based on a time derivative value of a physical quantity generated by a motion of a rider affecting leaning of the body frame. In this manner, the leaning-responsiveness-adjusting mechanism 74 adjusts responsiveness of leaning of the body frame to a motion of the rider.

An example of the time derivative value of the physical quantity for use in determination of the instruction value for the motor is a time derivative value of a leaning angle. The leaning-responsiveness-adjusting mechanism 74 acquires a lean angle velocity (roll rate), for example, as a time derivative value of the lean angle. The leaning-responsiveness-adjusting mechanism 74 is capable of acquiring a lean angle or a lean angle velocity from a sensor for monitoring a lean angle (lean angle sensor).

Figure 3:
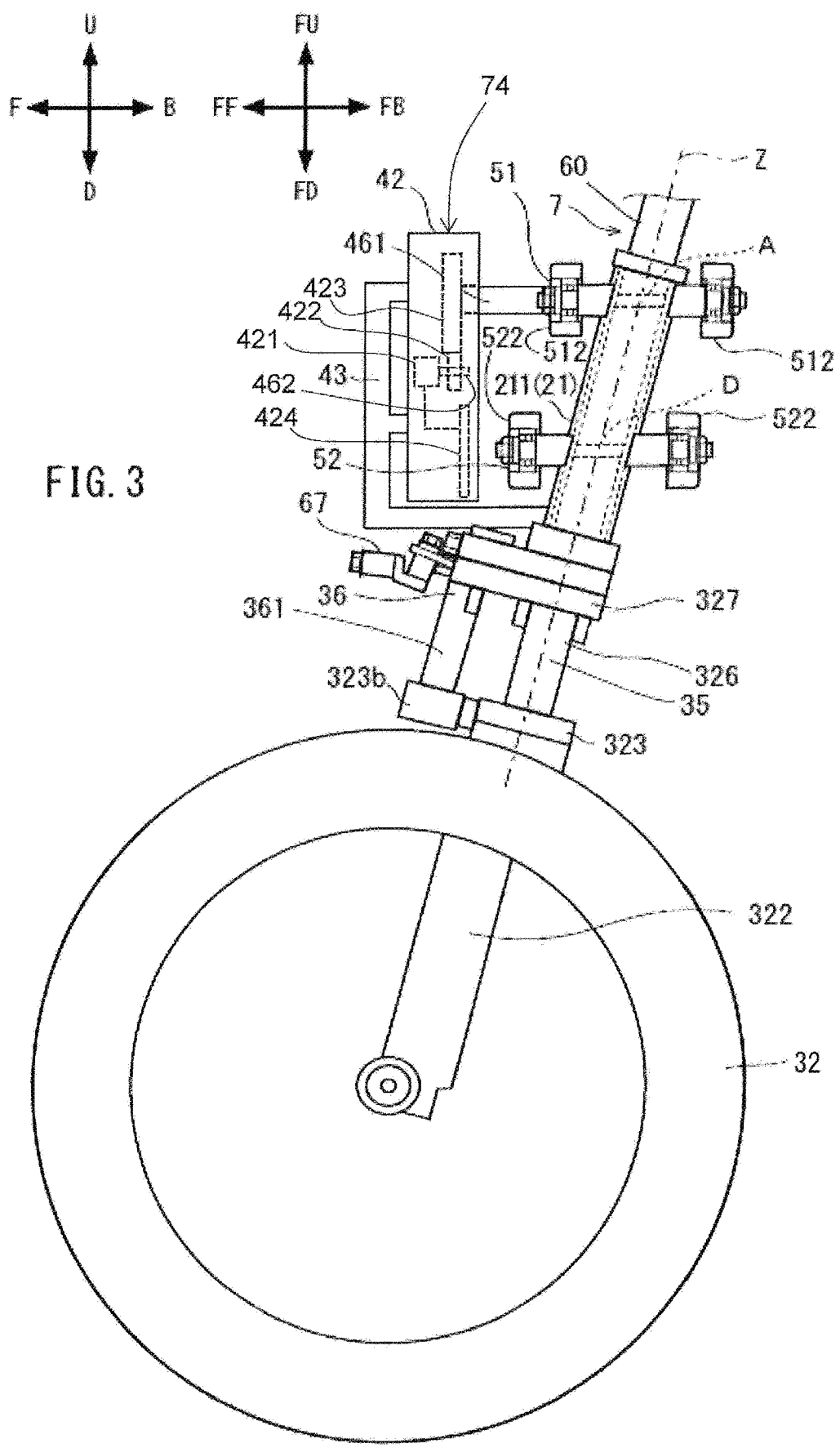
FIG. 3 is a left side view of a part of the vehicle illustrated in FIG. 1 when seen from the left.

FIG. 3 is a left side view of a front portion of the vehicle 1 when viewed from the left of the body frame 21. In FIG. 3, the body frame 21 is in the upright position. The following description with reference to FIG. 3 is based on a premise that the body frame 21 is in the upright position. FIG. 3 illustrates a state where the front cover 221, the front spoiler 222, and the pair of left- and right-front fenders 223 are detached in the vehicle 1. The left side member 54 and a left transfer plate 63 are not shown in FIG. 3.

The leaning-responsiveness-adjusting mechanism 74 includes an actuator 42 that outputs a torque for rotating the arms 51 and 52 with respect to the body frame 21. The actuator 42 is connected to the head pipe 211 (body frame 21) through a support member 43. The support member 43 fixes the actuator 42 to the body frame 21. The actuator 42 includes an output member 461 that applies a rotary force to the upper arm 51. The output member 461 applies a rotary force while being in contact with the upper arm 51. In the example illustrated in FIG. 3, the output member 461 is an output shaft that rotates about the rotation axis. The rotation axis of the output member 461 coincides with the rotation axis of the upper arm 51. Accordingly, rotation of the output member 461 is transferred to the rotation axis of the upper arm 51.

The actuator 42 includes a motor 421 as a power source, and a speed reducer that reduces the rotation speed of the motor 421 and outputs the resulting rotation. The speed reducer includes, for example, speed-reducing gears 422 and 423 that operate in conjunction with rotation of the motor 421. In the example illustrated in FIG. 3, the speed reducer includes the gear 422 using an output shaft 462 of the motor 421 as a shaft center and the gear 423 that meshes with the gear 422. The rotation axis of the gear 423 coincides with the rotation axis of the output member 461. Rotation of the output shaft 462 of the motor 421 is transferred to the rotation axis of the upper arm 51. This enables the motor 421 to apply a torque to the upper arm 51.

The actuator 42 further includes a control section 424 that controls the motor 421. The motor 421 operates based on a control signal (instruction value) supplied from the control section 424. For example, the control section 424 supplies an instruction value based on a lean angle velocity of the body frame 21, to the motor 421. The instruction value can be, for example, a value indicating an output torque of the motor 421. Specifically, the instruction value may be a current value of the motor 421. The control section 424 calculates the instruction value using a lean angle or a lean angle velocity acquired from the unillustrated lean angle sensor.

The control section 424 may be constituted by, for example, a control circuit mounted on a substrate or a computer including a processor and a memory. As illustrated in FIG. 3, the control section 424 may be incorporated in the actuator 42 or may be disposed outside the actuator 42. The control section 424 may be constituted by an electronic control unit (ECU), for example. In a case where the control section 424 is constituted by a computer, the process of the control section 424 can be implemented by, for example, executing a program read out from a memory with the processor. Such a program and a non-transitory recording medium in which the program is recorded are also included in the embodiment of the present teaching.

<Steering Mechanism 7>

As illustrated in FIG. 2, the steering mechanism 7 includes the handle 23 and a steering force transfer mechanism 6. The steering force transfer mechanism 6 includes a steering shaft 60 and a tie rod 67. In the example illustrated in FIG. 2, the steering force transfer mechanism 6 also includes the brackets 317 and 327 and the suspensions 33 and 35.

The steering force transfer mechanism 6 is rotatably supported on the head pipe 211 in a front portion of the body frame 21, integrally with the handle 23. The steering force transfer mechanism 6 changes the directions of the right front wheel 31 and the left front wheel 32 in accordance with rotation of the handle 23. That is, the steering force transfer mechanism 6 transfers a steering force with which the rider operates the handle 23, to the right front wheel 31 and the left front wheel 32 through the right bracket 317 and the left bracket 327. The steering mechanism 7 is an example of a reverse steering mechanism.

The rotation axis Z of the steering shaft 60 extends in the top-bottom direction of the body frame 21. The handle 23 is attached to an upper portion of the steering shaft 60. The steering shaft 60 rotates about the rotation axis Z in accordance with an operation of the handle 23 by the rider. The steering shaft 60 is rotatably supported on the head pipe 211. A lower portion of the steering shaft 60 is connected to the tie rod 67 extending in the left-right direction through an intermediate transfer plate 61. The intermediate transfer plate 61 is relatively non-rotatable with respect to the steering shaft 60. That is, the intermediate transfer plate 61 is rotatable together with the steering shaft 60 about the rotation axis Z of the steering shaft 60.

The right end of the tie rod 67 is connected to the right bracket 317 through a right transfer plate 62. The right transfer plate 62 is rotatable together with the right side member 53 about the axis of the right side member 53 extending in the top-bottom direction.

The left end of the tie rod 67 is connected to the left bracket 327 through the left transfer plate 63. The left transfer plate 63 is rotatable together with the left side member 54 about the axis of the left side member 54 extending in the top-bottom direction.

Figure 4:
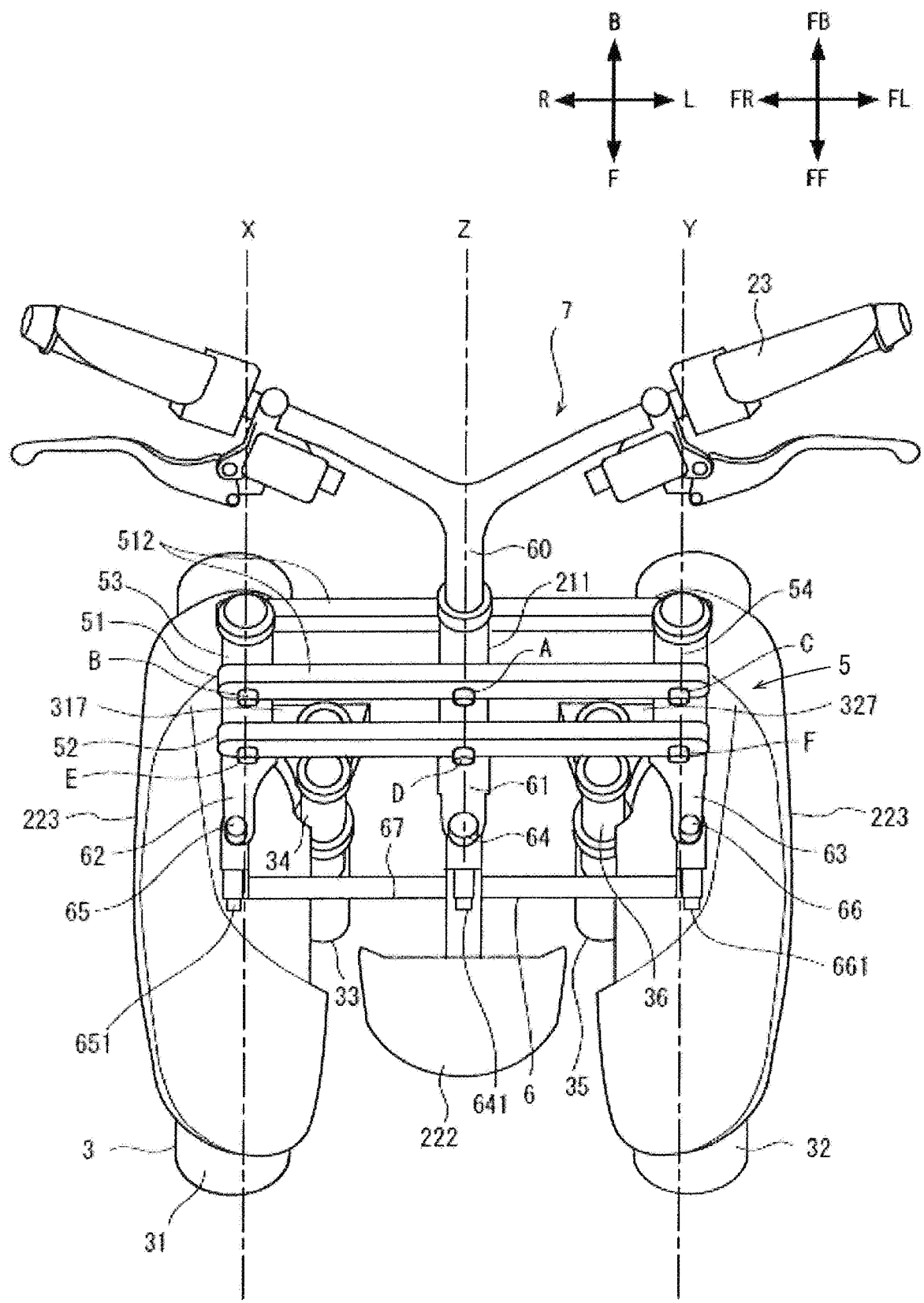
FIG. 4 is a plan view of a part of the vehicle illustrated in FIG. 1 when seen from above.

FIG. 4 is a plan view of a front portion of the vehicle 1 when viewed from above the body frame 21. In FIG. 4, the body frame 21 is in the upright position. The following description with reference to FIG. 4 is based on a premise that the body frame 21 is in the upright position. FIG. 4 illustrates a state where the front cover 221 is detached. In FIG. 4, the axis of the right side member 53 is defined as a right center axis X, and the axis of the left side member 54 is defined as a left center axis Y. The right center axis X and the left center axis Y extend in parallel with the rotation axis Z of the steering shaft 60.

As illustrated in FIG. 4, the intermediate transfer plate 61, the right transfer plate 62, and the left transfer plate 63 are connected to the tie rod 67 through an intermediate front rod 641, a right front rod 651, and a left front rod 661, respectively. The intermediate front rod 641, the right front rod 651, and the left front rod 661 extend in the front-rear direction of the body frame 21, and are rotatable about the axis thereof. Accordingly, the intermediate front rod 641, the right front rod 651, and the left front rod 661 are connected to the tie rod 67 to be rotatable about the axis extending in the front-rear direction.

The intermediate front rod 641, the right front rod 651, and the left front rod 661 are connected to the intermediate transfer plate 61, the right transfer plate 62, and the left transfer plate 63 through an intermediate joint 64, a right joint 65, and a left joint 66, respectively. The intermediate front rod 641 is rotatable about an axis parallel to the rotation axis Z with respect to the intermediate transfer plate 61. The right front rod 651 is rotatable about an axis parallel to the right center axis X with respect to the right transfer plate 62. The left front rod 661 is rotatable about an axis parallel to the left center axis Y with respect to the left transfer plate 63.

Figure 5:
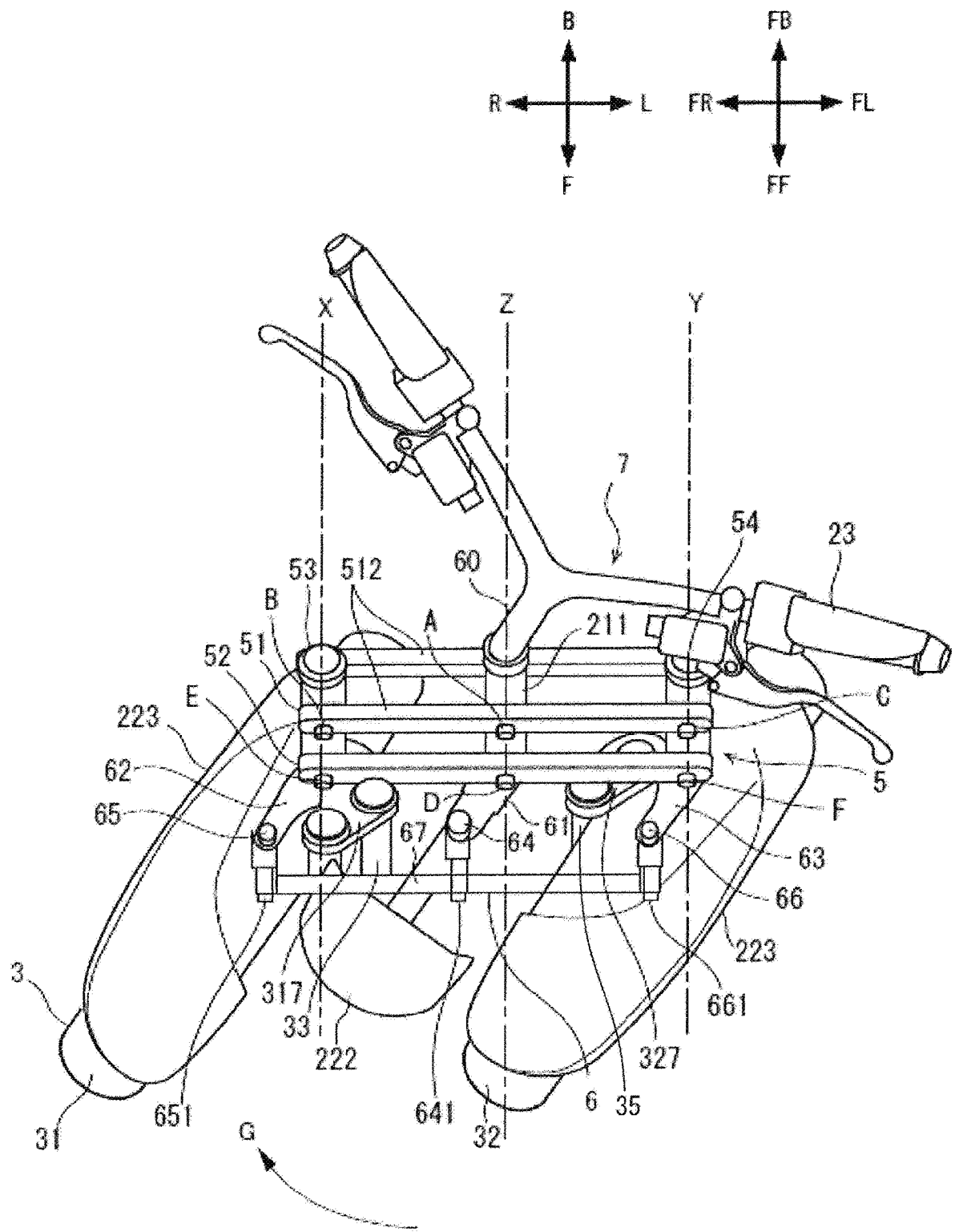
FIG. 5 is a plan view of a part of the vehicle illustrated in FIG. 1 in rightward steering when seen from above.

FIG. 5 is a plan view of a front portion of the vehicle 1 when viewed from above the body frame 21 in a state where the right front wheel 31 and the left front wheel 32 are steered rightward. FIG. 5 illustrates a state where the front cover 221 is detached in the vehicle 1.

When the rider operates the handle 23, the steering shaft 60 rotates about the rotation axis Z with respect to the head pipe 211. In the case of rightward steering of the vehicle 1 illustrated in FIG. 5, the steering shaft 60 rotates in the direction of arrow G. With the rotation of the steering shaft 60, the intermediate transfer plate 61 rotates about the rotation axis Z in the direction of arrow G with respect to the head pipe 211.

With the rotation of the intermediate transfer plate 61 in the direction of arrow G, the intermediate front rod 641 rotates about the intermediate joint 64 in the direction opposite to arrow G with respect to the intermediate transfer plate 61. Accordingly, the tie rod 67 moves right-rearward while maintaining its posture.

With the right-rearward movement of the tie rod 67, the right front rod 651 and the left front rod 661 rotate about the right joint 65 and the left joint 66, respectively, in the direction opposite to arrow G. Accordingly, the right transfer plate 62 and the left transfer plate 63 rotate in the direction of arrow G while the tie rod 67 maintains its posture.

With the rotation of the right transfer plate 62 in the direction of arrow G, the right bracket 317, which is relatively non-rotatable with respect to the right transfer plate 62, rotates about the right center axis X in the direction of arrow G with respect to the right side member 53.

When the left transfer plate 63 rotates in the direction of arrow G, the left bracket 327, which is relatively non-rotatable with respect to the left transfer plate 63, rotates about the left center axis Y in the direction of arrow G with respect to the left side member 54.

When the right bracket 317 rotates in the direction of arrow G, the right suspension 33, which is connected to the right bracket 317 through the right inner cylinder 316, rotates about the right center axis X in the direction of arrow G with respect to the right side member 53. Accordingly, the right front wheel 31 supported by the right suspension 33 rotates about the right center axis X in the direction of arrow G with respect to the right side member 53.

When the left bracket 327 rotates in the direction of arrow G, the left suspension 35, which is connected to the left bracket 327 through the left inner cylinder 326, rotates about the left center axis Y in the direction of arrow G with respect to the left side member 54. Accordingly, the left front wheel 32 supported by the left suspension 35 rotates about the left center axis Y in the direction of arrow G with respect to the left side member 54.

As described above, the steering force transfer mechanism 6 transfers a steering force to the right front wheel 31 and the left front wheel 32 in accordance with an operation of the handle 23 by the rider. The right front wheel 31 and the left front wheel 32 rotate about the right center axis X and the left center axis Y, respectively, in the directions in accordance with the operation direction of the handle 23 by the rider.

<Lean Operation of Vehicle 1>

Figure 6:
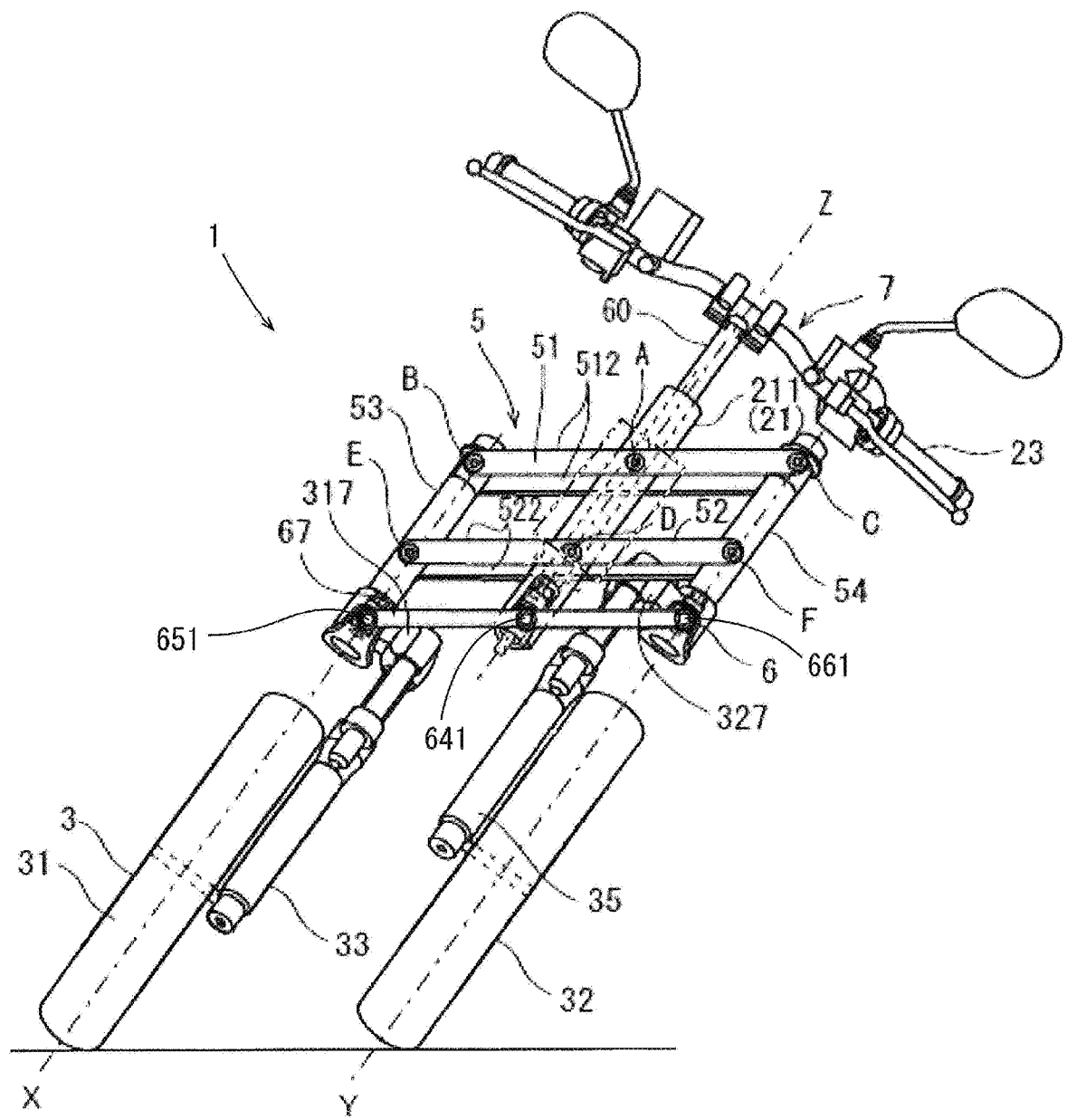
FIG. 6 is a front view of a part of the vehicle illustrated in FIG. 1 in leftward leaning when seen from the front.

Next, with reference to FIGS. 2 and 6, a lean operation of the vehicle 1 will be described. FIG. 6 is a front view of a front portion of the vehicle 1 in a state where the body frame 21 leans leftward when viewed from the front of the body frame 21. FIG. 6 illustrates a state where the front cover 221, for example, is detached in the vehicle 1.

As illustrated in FIG. 2, in the upright position of the body frame 21, the leaning mechanism 5 forms a rectangle when the vehicle 1 is seen from the front of the body frame 21. As illustrated in FIG. 6, in the leaning state of the body frame 21, the leaning mechanism 5 forms a parallelogram when the vehicle 1 is seen from the front of the body frame 21. Actuation of the leaning mechanism 5 is in conjunction with leaning of the body frame 21 in the left direction or in the right direction. The actuation of the leaning mechanism 5 means that the upper arm 51, the lower arm 52, the right side member 53, and the left side member 54 constituting the leaning mechanism 5 relatively rotate about the rotation axes respectively passing through the support parts A through F thereof so that the leaning mechanism 5 is thereby deformed.

For example, as illustrated in FIG. 6, when the rider leans the vehicle 1 leftward, the head pipe 211, that is, the body frame 21, leans leftward relative to a vertical direction. When the body frame 21 leans, the upper arm 51 rotates about the axis passing through the support part A counterclockwise with respect to the body frame 21 when seen from the front of the vehicle. Similarly, the lower arm 52 rotates counterclockwise about the axis passing through the support part D with respect to the body frame 21 when seen from the front of the vehicle. Accordingly, the upper arm 51 moves leftward relative to the lower arm 52, as illustrated in FIG. 6.

With the leftward movement of the upper arm 51, the upper arm 51 rotates about the axis passing through the support part B and the axis passing through the support part C counterclockwise with respect to the right side member 53 and the left side member 54, respectively, when seen from the front of the vehicle. Similarly, the lower arm 52 rotates about the axis passing through the support part E and the axis passing through the support part F counterclockwise with respect to the right side member 53 and the left side member 54, respectively, when seen from the front of the vehicle. Accordingly, the right side member 53 and the left side member 54 lean leftward relative to the vertical direction while maintaining a posture parallel to the body frame 21. The body frame 21 rotates clockwise about the roll axis when seen from the front of the vehicle.

At this time, the lower arm 52 moves leftward relative to the tie rod 67. With the leftward movement of the lower arm 52, the intermediate front rod 641, the right front rod 651, and the left front rod 661 rotate with respect to the tie rod 67. Accordingly, the tie rod 67 maintains a posture parallel to the upper arm 51 and the lower arm 52.

With the leftward leaning of the right side member 53, the right front wheel 31, which is connected to the right side member 53 through the right bracket 317 and the right suspension 33, leans leftward while maintaining a posture parallel to the body frame 21.

With the leftward leaning of the left side member 54, the left front wheel 32, which is connected to the left side member 54 through the left bracket 327 and the left suspension 35, leans leftward while maintaining a posture parallel to the body frame 21.

The leaning motions of the right front wheel 31 and the left front wheel 32 have been described with respect to the vertical direction. In a leaning motion of the vehicle 1 (in actuation of the leaning mechanism 5), the top-bottom direction of the body frame 21 does not coincide with the vertical direction. In the case where the description is given with respect to the top-bottom direction of the body frame 21, in actuation of the leaning mechanism 5, relative positions of the right front wheel 31 and the left front wheel 32 relative to the body frame 21 are changed. In other words, the leaning mechanism 5 leans the body frame 21 relative to the vertical direction by changing the relative positions of the right front wheel 31 and the left front wheel 32 relative to the body frame 21 in the top-bottom direction of the body frame 21.

<Leaning-Responsiveness-Adjusting Mechanism>

Figure 7:
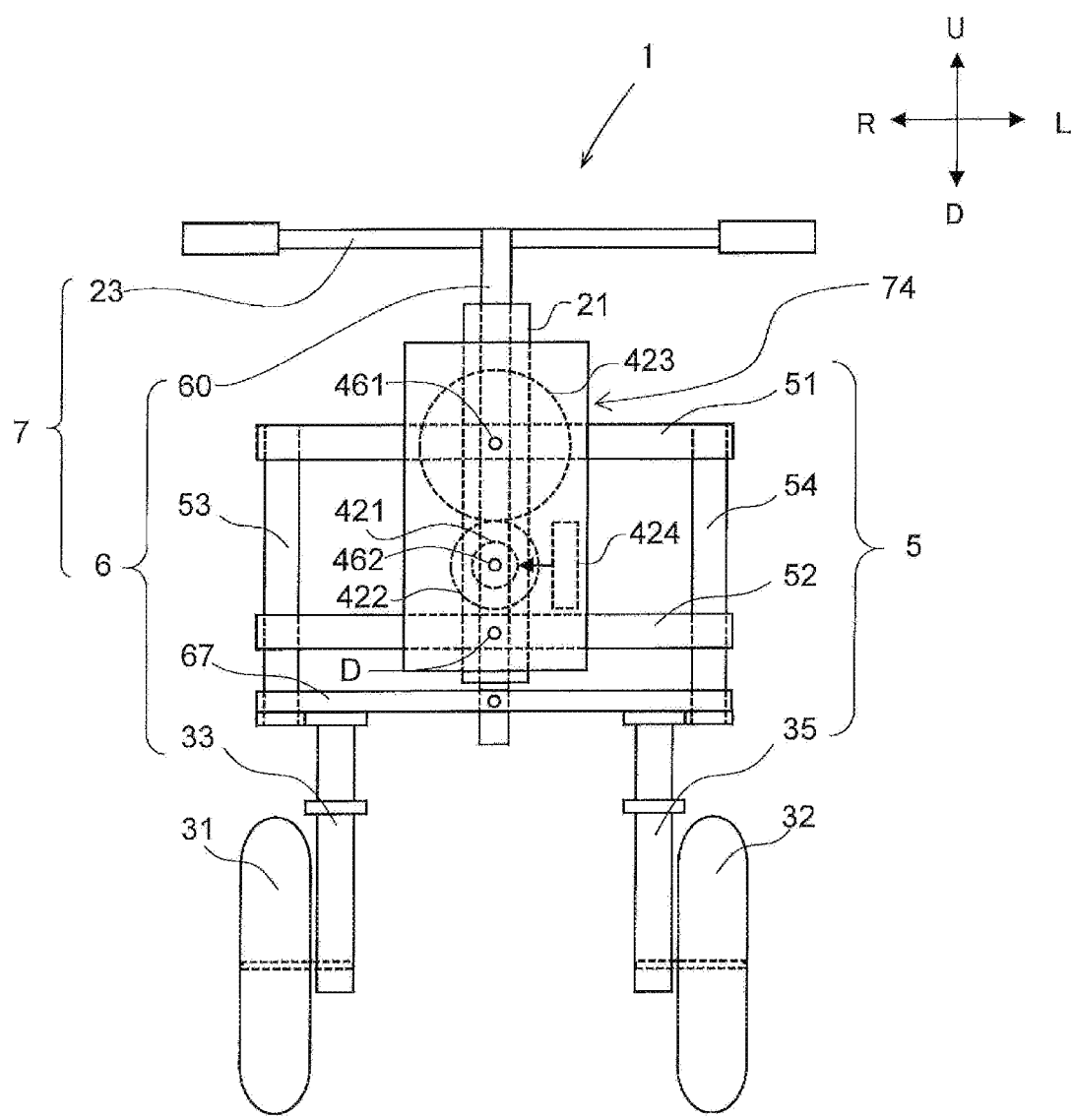
FIG. 7 is a view illustrating an example configuration for adjusting responsiveness of leaning of the vehicle.

FIG. 7 is a view illustrating an example configuration for adjusting responsiveness of leaning of the vehicle 1. As illustrated in FIG. 7, the vehicle 1 includes the body frame 21, the right front wheel 31 and the left front wheel 32 arranged side by side in the left-right direction of the vehicle 1, the leaning mechanism 5, the steering mechanism 7, and the leaning-responsiveness-adjusting mechanism 74. The body frame 21 leans in the left direction with respect to the top-bottom direction of the vehicle 1 when the vehicle 1 turns leftward, and leans in the right direction with respect to the top-bottom direction of the vehicle 1 when the vehicle 1 turns rightward.

The leaning mechanism 5 includes the arms 51 and 52 rotatably supported by the body frame 21. The arms 51 and 52 steerably support the right front wheel 31 and the left front wheel 32. In this example, the right ends of the arms 51 and 52 are connected to the right front wheel 31 through the right side member 53 and the right suspension 33. The left ends of the arms 51 and 52 are connected to the left front wheel 32 through the left side member 54 and the left suspension 35. The arms 51 and 52 rotate relative to the body frame 21 so that the relative positions of the left front wheel 32 and the right front wheel 31 in the top-bottom direction with respect to the body frame 21 are changed. Accordingly, the body frame 21 leans in the left direction or in the right direction with respect to the top-bottom direction of the vehicle 1.

As described above, in the vehicle 1, the arms 51 and 52 steerably supporting the right front wheel 31 and the left front wheel 32 rotate with respect to the body frame 21 so that the body frame 21 leans in the left direction or in the right direction. A steering force input to the handle 23 is transferred to the right front wheel 31 and the left front wheel 32 by the steering mechanism 7. The steering mechanism 7 mechanically transfers leftward rotation of the handle 23 to steer the right front wheel 31 and the left front wheel 32 leftward so that the body frame 21 can be leaned in the right direction with respect to the top-bottom direction of the vehicle 1. In addition, the steering mechanism 7 mechanically transfers rightward rotation of the handle 23 to steer the right front wheel 31 and the left front wheel 32 rightward so that the body frame 21 can lean in the left direction with respect to the top-bottom direction of the vehicle 1. That is, the vehicle 1 is a leaning vehicle capable of performing reverse steering.

In the example illustrated in FIG. 7, the steering mechanism 7 includes the handle 23, the steering shaft 60 that rotates with rotation of the handle 23, the tie rod 67 that moves in the left direction or in the right direction of the body frame 21 with rotation of the steering shaft 60, the left suspension 35 that supports the left front wheel 32 and rotates with movement of the tie rod 67 in the left direction or in the right direction, and the right suspension 33 that supports the right front wheel 31 and rotates with movement of the tie rod 67 in the left direction or in the right direction.

The leaning-responsiveness-adjusting mechanism 74 includes the motor 421 connected to the body frame 21 and an arm (upper arm 51). The motor 421 applies, to the arms 51 and 52 steerably supporting the left front wheel 32 and the right front wheel 31, a torque in a direction in which the arms 51 and 52 rotate with respect to the body frame 21. The leaning-responsiveness-adjusting mechanism 74 controls the motor 421 using an instruction value based on a time derivative value of a physical quantity generated by a motion of the rider affecting leaning of the body frame 21. Accordingly, responsiveness of leaning of the body frame 21 of the vehicle 1 can be adjusted.

The leaning-responsiveness-adjusting mechanism 74 includes the control section 424 that controls a torque output from the motor 421 by supplying an instruction value to the motor 421. The control section 424 supplies, to the motor 421, an instruction value based on a time derivative value of a physical quantity generated by a motion of the rider affecting leaning of the body frame 21. Thus, the control section 424 executes a process of acquiring the time derivative value of the physical quantity, a process of calculating the instruction value using the time derivative value of the physical quantity, and a process of outputting the calculated instruction value to the motor 421.

The motion of the rider affecting leaning of the body frame 21 is, for example, a barycenter shift of the body of the rider, handle manipulation (steering manipulation), an accelerator manipulation during cornering, and a braking operation during cornering. The physical quantity generated by the motion of the rider is, for example, a value representing a motion of a member to which a rider makes an input (e.g., a handle, an accelerator, or a brake), a force exerted on this member, a motion of the rider himself/herself, or behavior of the vehicle resulting from these motions (e.g., leaning, vehicle speed, acceleration, or barycenter shift of the vehicle).

The physical quantity generated by a motion of the rider affecting leaning of the body frame 21 or a time derivative value of this physical quantity is detected by a sensor included in the vehicle 1. This sensor may be a sensor for detecting a motion of the rider or a sensor for detecting a vehicle state that changes depending on a motion of the rider.

The control section 424 acquires a time derivative value of the physical quantity by receiving a time derivative value of the physical quantity detected by the sensor or by calculating a time derivative value from the physical quantity detected by the sensor. The time derivative value of the physical quantity is a value based on the amount of change in the physical quantity per a unit time, and is, for example, a value indicating the amount of change (change rate) in the physical quantity per a unit time, a value obtained by performing operations such as differential operation on a detected physical quantity, or a value detected as the amount of change in the physical quantity per a unit time.

The control section 424 calculates an instruction value from the time derivative value of the physical quantity and supplies the instruction value to the motor 421. The instruction value to be supplied to the motor 421 can be a value indicating a direction and a magnitude of a torque output by the motor 421. In this case, the control section 424 calculates the direction and the magnitude of the torque using the time derivative value of the physical quantity. The control section 424 may determine an instruction value in accordance with the time derivative value of the physical quantity by using correspondence data indicating a correspondence between a time derivative value of a physical quantity and an instruction value previously stored in a memory. The correspondence data may be data indicating a function using a time derivative value of a physical quantity as a variable or data indicating a correspondence between a time derivative value of a physical quantity and an instruction value (e.g., map data or table data).

As an example, a time derivative value (dx/dt) of a physical quantity x acquired by the control section 424 is used to calculate an instruction value Ts indicating a direction and a magnitude of a torque T of the motor 421 by Equation (1):

$$Ts=a(dx/dt) \qquad (1)$$

In Equation (1), a coefficient a is a constant or a value (variable) that varies depending on a vehicle state (e.g., lean angle and vehicle speed). Another term may be added to Equation (1). For example, a term of the physical quantity x (bx), a term of a second time derivative value of the physical quantity x ($c(d^2x/dt^2)$), or a constant term d may be added to Equation (1). A term of a quadratic or higher-order term of (dx/dt), such as $e(dx/dt)^2$, may be added to Equation (1). Coefficients b, c, d, and e in the above example may be constants or values that vary depending on the vehicle state.

The control section 424 may calculate an instruction value by using time derivative values (dx1/dt), (dx2/dt), . . . , and (dxN/dt) of a plurality of physical quantities x1, x2, . . . , and xN. The control section 424 can calculate an instruction value Ts by Equation (2):

$$Ts=a1(dx1/dt)+a2(dx2/dt), \ldots, +aN(dxN/dt) \qquad (2)$$

In Equation (2), N is a natural number, and each of a1, a2, and aN is a constant or a variable that changes depending on the vehicle state. As an example, the physical quantity x1 is a lean angle, and the physical quantity x2 is a steering torque.

As described above, the instruction value Ts can be a value with which a torque in accordance with a time derivative value of a physical quantity is output from the motor 421. That is, the control section 424 is capable of causing the motor 421 to output a torque with a direction and a magnitude in accordance with a time derivative value of a physical quantity.

The control section 424 implements, for example, a first adjustment in which a torque T applied to the arms 51 and 52 by the motor 421 increases as the time derivative value of the physical quantity increases or a second adjustment in which the torque T applied to the arms 51 and 52 by the motor 421 increases as the time derivative value of the physical quantity decreases.

Alternatively, the control section 424 may also perform adjustment as a combination of the first adjustment and the second adjustment. In the case of combining the first adjustment and the second adjustment, the first adjustment and the second adjustment can be switched to each other depending on the vehicle state (e.g., a lean angle and a vehicle speed).

(Instruction Value Determination Example Using Lean Angle Velocity)

Next, as an example, it will be described a case where the time derivative value of the physical quantity is a time derivative value (dθ/dt) of a lean angle θ as a rotation angle of the body frame 21 about the vehicle front-rear axis extending in the front-rear direction of the vehicle 1.

Figure 8:
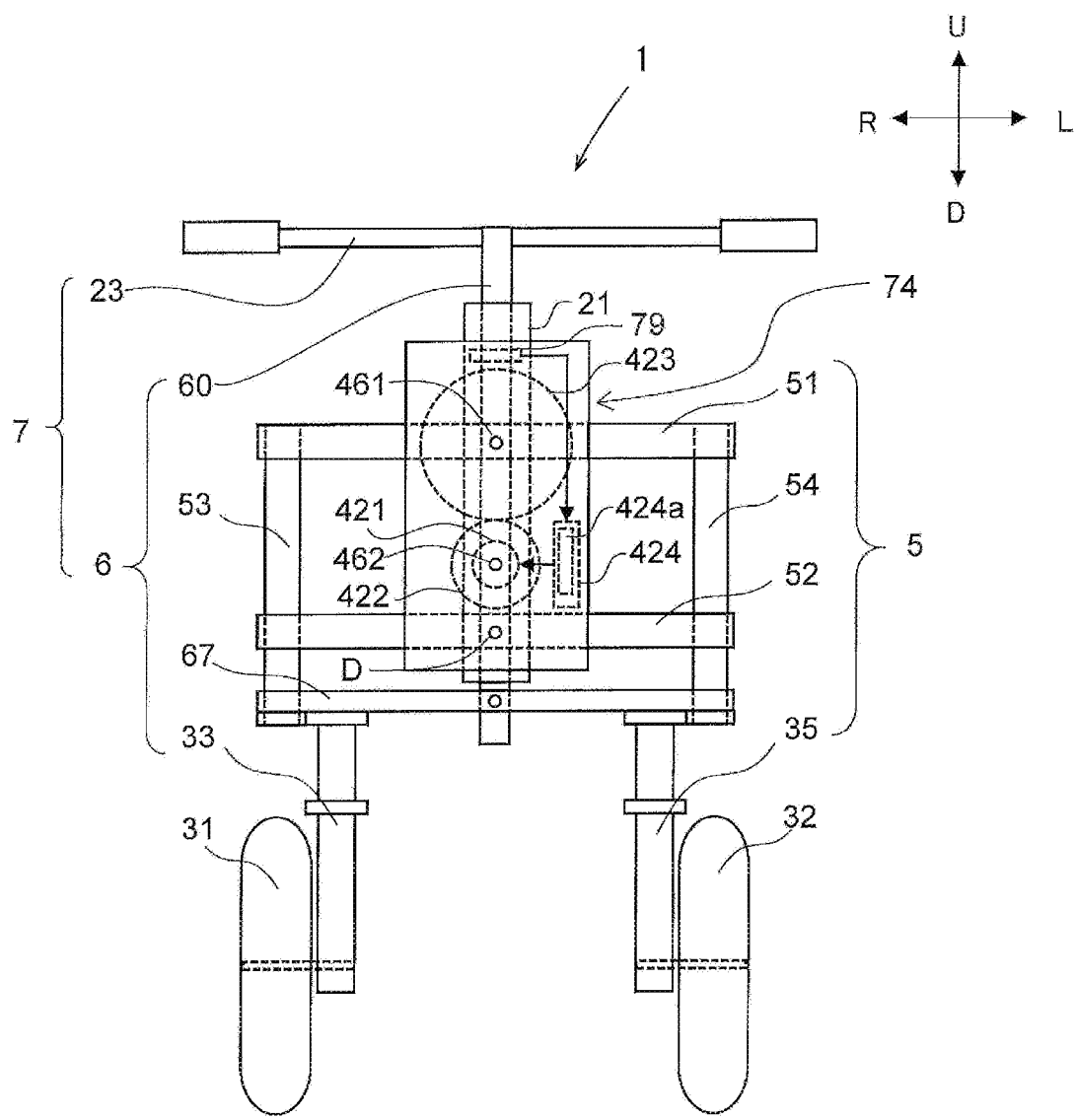
FIG. 8 is a view illustrating a schematic configuration of a vehicle including a lean angle sensor.

FIG. 8 is a view illustrating a schematic configuration of the vehicle 1 including a lean angle sensor 79. In the example illustrated in FIG. 8, the vehicle 1 includes the lean angle sensor 79. The control section 424 acquires a lean angle or a lean angle velocity (roll rate) detected by the lean angle sensor 79. The control section 424 includes an instruction value calculator 424a that calculates an instruction value based on a lean angle velocity (dθ/dt) obtained from the lean angle sensor 79.

The instruction value calculator 424a is capable of calculating, using the lean angle velocity (dθ/dt), an instruction value Ts indicating a direction and a magnitude of a torque T of the motor 421 by Equation (3):

$$Ts=K\alpha(d\theta/dt)+K\beta(d\theta/dt) \qquad (3)$$

In Equation (3), positive and negative signs for Ts represent the direction of the torque T output from the motor 421. In this embodiment, as an example, a positive value of Ts (Ts>0) represents a torque in a direction in which the arms 51 and 52 are rotated counterclockwise when seen from the viewpoint of the rider, that is, a direction in which the body frame 21 is leaned rightward. A negative value of Ts (Ts<0) represents a torque in a direction in which the arms 51 and 52 are rotated clockwise when seen from the viewpoint of the rider, that is, a direction in which the body frame 21 is leaned leftward. In this case, the lean angle θ is a positive value (θ>0) in a case where the top-bottom direction of the body frame 21 is leaned rightward relative to the vertical direction, is a negative value (θ<0) in a case where the top-bottom direction of the body frame 21 is leaned leftward relative to the vertical direction, and is zero (θ=0) in a case where the body frame 21 is in the upright position.

In the following description, with reference to the vertical direction, one of the left direction or the right direction of the vehicle 1 in which the absolute value of the lean angle θ increases will be referred to as a direction in which the lean angle changes. In a case where the direction of a torque and a direction in which the lean angle changes are the same, the positive or negative sign of the value of the lean angle velocity is the same as the positive or negative sign of the value of the torque.

In Equation (3), relationships of Kα>0 and Kβ<0 can be established. In this case, Kα(dθ/dt) represents a component of a torque in the same direction as the direction in which the lean angle changes, and Kβ(dθ/dt) represents a component of a torque in a direction opposite to the direction in which the lean angle changes. Here, Kα and Kβ are values that change depending on the vehicle state. For example, the values of Kα and Kβ change depending on at least one of the vehicle speed V or the lean angle θ.

In the case of |Kα|>|Kβ|, the instruction value calculator 424a calculates a positive torque instruction value Ts. In this case, the control section 424 causes the motor 421 to generate a torque T in the same direction as the direction in which the lean angle changes and having a magnitude in accordance with the lean angle velocity. In this case, depending on the vehicle state, the motor 421 can apply, to the arms 51 and 52, a torque T that assists a motion of the rider for leaning the body frame 21 and has a magnitude in accordance with a lean angle velocity as a time derivative value of a physical quantity generated by a motion of the rider. Accordingly, the body frame 21 can be leaned to assist a motion of the rider for leaning the body frame 21. That is, responsiveness of leaning can be enhanced.

In the case of |Kα|<|Kβ|, the instruction value calculator 424a calculates a negative torque instruction value Ts. In this case, the control section 424 causes the motor 421 to generate a torque T in a direction opposite to the direction in which the lean angle changes and having a magnitude in accordance with the lean angle velocity. In this case, the motor 421 is capable of applying, to the arms 51 and 52, a torque that resists a motion of the rider for leaning the body frame 21 and having a magnitude in accordance with the lean angle velocity as a time derivative value of a physical quantity generated by a motion of the rider, depending on the vehicle state. Accordingly, the body frame 21 does not easily lean with respect to a motion of the rider for leaning the body frame 21.

As described above, depending on the vehicle state, the control section 424 can switch between an operation of causing the motor 421 to output a torque T in the same direction as the direction of a leaning motion of the rider or an operation of causing the motor 421 to output a torque T for resisting a leaning motion of the rider.

Figure 9:
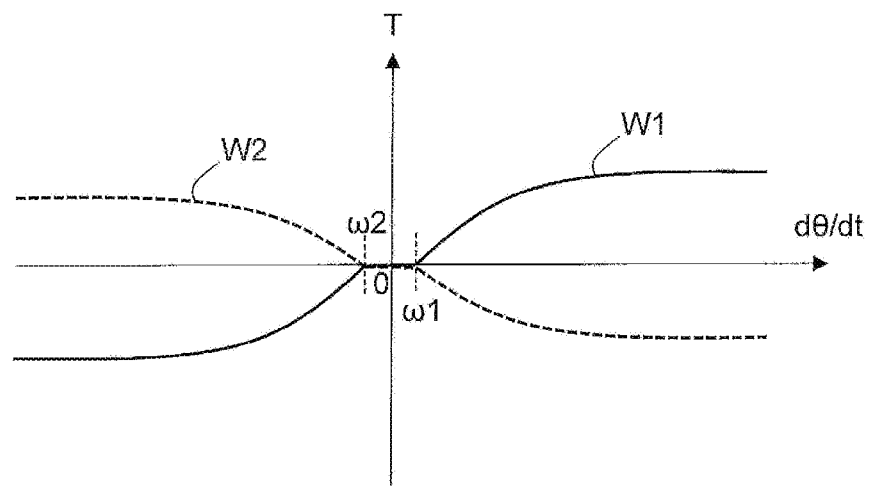
FIG. 9 is a graph showing an example of a torque applied by a leaning-responsiveness-adjusting mechanism.

FIG. 9 is a graph showing an example of a torque T applied by the leaning-responsiveness-adjusting mechanism 74. In the graph shown in FIG. 9, W1 is an example of a torque change in a case where the motor 421 generates a torque T in the same direction as the direction in which the lean angle changes and having a magnitude in accordance with the lean angle velocity. In FIG. 9, W2 shows an example of a torque change in a case where the motor 421 generates a torque T in a direction opposite to the direction in which the lean angle changes and having a magnitude in accordance with the lean angle velocity. The control section 424 can switch torque control between torque control that causes the motor 421 to generate a torque change as indicated by W1 and torque control that causes the motor 421 to generate a torque change as indicated by W2, depending on the vehicle state. In the example shown in FIG. 9, in a case where the lean angle velocity dθ/dt satisfies ω2<dθ/dt<ω1, the torque T is constant independently of dθ/dt.

In the torque control as indicated by W1 in FIG. 9, a torque generated by the motor increases as a change in physical quantity with time caused by a motion of the rider increases. In the torque control as indicated by W2 in FIG. 9, a torque generated by the motor decreases as the change in physical quantity with time caused by a motion of the rider increases. The torque changes indicated by W1 and W2 in FIG. 9 are consecutive changes with respect to dθ/dt. On the other hand, an instruction value for the motor may be determined such that the torque T changes stepwise in accordance with a change in dθ/dt.

Figure 10:
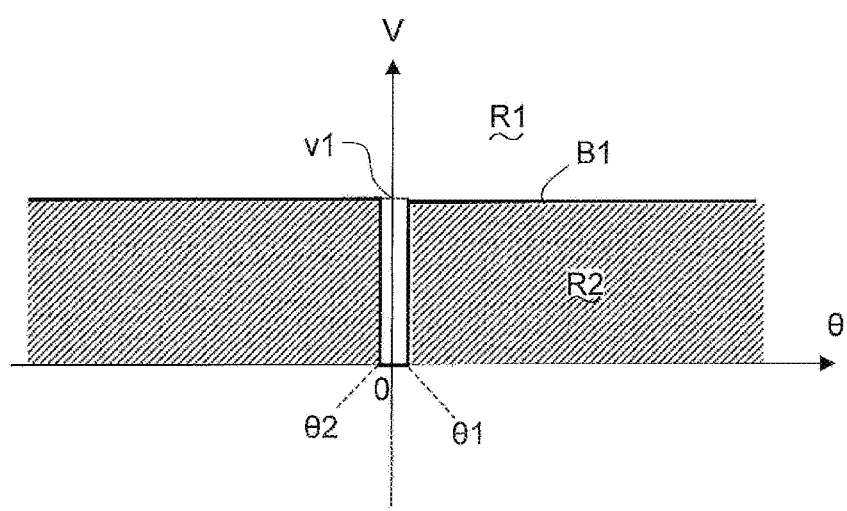
FIG. 10 is a graph illustrating an example of a vehicle state for use in motor control.

FIG. 10 is a graph showing an example of the vehicle state based on the vehicle speed V and the lean angle θ for use in motor control. In FIG. 10, B1 represents the boundary between two vehicle states. In this example, a case where θ2<θ<θ1 and V>0, a case where θ2>0 and V>v1, and a case where θ1<0 and V>v1 are referred to as a first vehicle state R1, and a case where θ2≥θ and V≤v1 and a case where θ1≤θ and V≤v1 are referred to as a second vehicle state R2.

The control section 424 can perform torque control as indicated by W1 in FIG. 9 in a case where the vehicle state of the vehicle 1 is the first vehicle state R1, and perform torque control as indicated by W2 in FIG. 9 in a case where the vehicle state of the vehicle 1 is the second vehicle state R2, for example. Accordingly, in a case where the vehicle speed V is higher than v1 or a case where the lean angle θ is small (i.e., the lean angle θ is between θ1 and θ2), a leaning motion of the rider is assisted so that responsiveness of leaning can be enhanced. On the other hand, in a case where the vehicle speed V is lower than v1 and the lean angle θ is large (i.e., the lean angle is out of the range from θ1 to θ2), responsiveness of leaning is reduced and priority is given on a straight-traveling characteristic.

Figure 11:
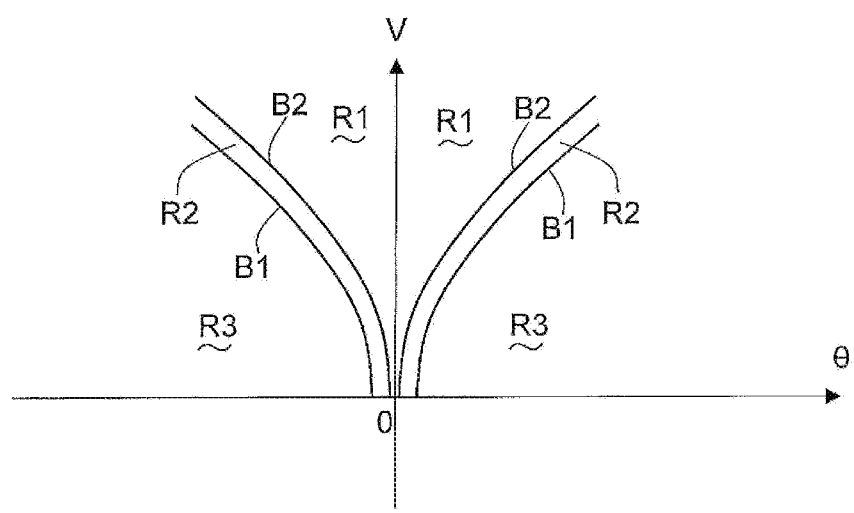
FIG. 11 is a graph showing another example of a vehicle state for use in motor control.

FIG. 11 is a graph showing another example of the vehicle state based on the vehicle speed V and the lean angle θ for use in motor control. In FIG. 11, each of B1 and B2 represents a boundary between two vehicle states. In FIG. 11, a region where V is larger than B2 represents the first vehicle state R1. In FIG. 11, a region between the boundary B1 and the boundary B2 represents the second vehicle state R2. In FIG. 11, a region where V is smaller than the boundary B1 represents a third vehicle state R3.

The control section 424 can perform torque control as indicated by W1 in FIG. 9 in a case where the vehicle state of the vehicle 1 is the first vehicle state R1, and perform torque control as indicated by W2 in FIG. 9 in a case where the vehicle state of the vehicle 1 is the second vehicle state R2. That is, in the case where the vehicle 1 is in the first vehicle state R1, the control section 424 performs control such that the torque T of the motor 421 increases as the lean angle velocity dθ/dt increases. In the state where the vehicle 1 is in the second vehicle state R2, the control section 424 performs control such that the torque T of the motor 421 decreases as the lean angle velocity dθ/dt increases.

Accordingly, in the case where the vehicle state of the vehicle 1 is the first vehicle state R1 where the lean angle θ is smaller than a threshold, the control section 424 controls the motor 421 to assist a leaning motion of the rider so that responsiveness of leaning can be enhanced. In the case where the vehicle state of the vehicle 1 is in the second vehicle state R2 where the lean angle θ exceeds the threshold, the control section 424 controls the motor 421 to resist a leaning motion of the rider so that responsiveness of leaning is reduced. In addition, in the example illustrated in FIG. 11, the threshold of the lean angle θ increases as the vehicle speed V increases. That is, the range of the lean angle θ for enhancing responsiveness of leaning increases as the vehicle speed V increases. This enables adjustment of responsiveness of leaning in consideration of the lean angle θ and the vehicle speed V. Consequently, it is possible to adjust responsiveness of leaning more precisely.

In turning a leaning vehicle, the rider leans a body frame in the turning direction. The leaning of the body frame in the turning direction tends to increase as the vehicle speed increases. In accordance with this tendency, the boundary B2 between the first vehicle state R1 and the second vehicle state R2 in FIG. 11 can be set. Accordingly, responsiveness of leaning can be adjusted such that leaning of the body frame in the turning direction during turning is within an appropriate range in accordance with the vehicle speed.

In the third vehicle state R3, the control section 424 is configured to cause the motor 421 not to apply a torque in a direction in which the arms rotate with respect to the body frame, for example. Alternatively, in the third vehicle state R3 where a lean angle θ of the body frame in the left direction or in the right direction is greater than or equal to the threshold, the control section 424 may perform control of causing the motor 421 to output a torque T that assists a motion of raising the body frame by the rider.

The calculation of the instruction value using the lean angle velocity (dθ/dt) is not limited to the examples described above. For example, the instruction value calculator 424a can calculate an instruction value Ts indicating a direction and a magnitude of the torque T of the motor 421, by Equation (4):

$$Ts=K\alpha(d\theta/dt)+K\beta(d\theta/dt)+K\omega(d^2\theta/d^2t) \quad (4)$$

In Equation (4), $K\omega(d^2\theta/d^2t)$ is a term of the lean angle acceleration $(d^2\theta/d^2t)$. As described above, determination of an instruction value using the lean angle acceleration $(d^2\theta/d^2t)$ can adjust responsiveness of leaning in consideration of an inertia component of a leaning motion of the body frame 21.

As yet another example, the instruction value calculator 424a may calculate an instruction value Ts indicating a direction and a magnitude of a torque T of the motor 421, by Equation (5):

$$Ts=K\alpha(d\theta/dt)+K\beta(d\theta/dt)+Ks(dS/dt) \quad (5)$$

In Equation (5), Ks(dS/dt) is a term of a steering angular velocity (dS/dt). As described above, determination of an instruction value using the steering angular velocity (dS/dt) enables adjustment of responsiveness of leaning in accordance with the steering speed of the rider.

<Variations of Leaning Mechanism>

The configuration of the leaning mechanism 5 is not limited to the parallelogram linkage illustrated in in FIG. 2. The leaning mechanism may include a shock tower as an arm that rotates with respect to the body frame, for example.

Figure 12:
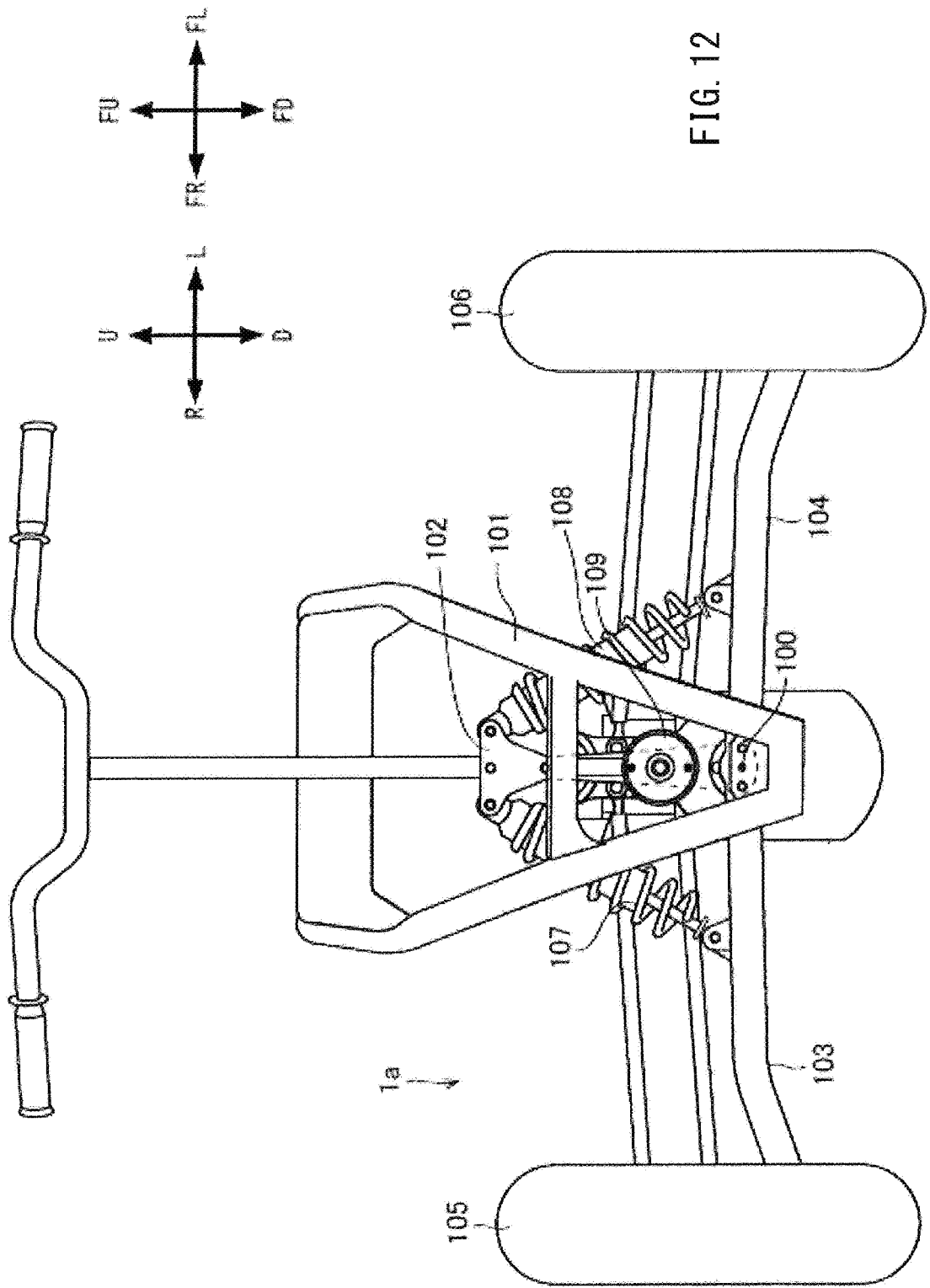
FIG. 12 is a view illustrating a variation of a leaning mechanism.

FIG. 12 is a view illustrating an example of the leaning mechanism including the shock tower. In the example illustrated in FIG. 12, a shock tower 102 is attached to a body frame 101 to be rotatable about a rotating shaft 100. The vehicle 1a includes a right suspension arm 103, a left suspension arm 104, a right suspension 107, and a left suspension 108.

The right suspension arm 103 is rotatably connected to the body frame 101 at one end and is rotatably connected to a right front wheel 105 at the other end. The left suspension arm 104 is rotatably connected to the body frame 101 at one end and is rotatably connected to a left front wheel 106 at the other end.

The right suspension 107 is rotatably connected to the right suspension arm 103 at one end and is rotatably connected to the shock tower 102 at the other end. The left suspension 108 is rotatably connected to the left suspension arm 104 at one end and is rotatably connected to the shock tower 102 at the other end.

An actuator 109 adjusts rotation of the shock tower 102 with respect to the body frame 101. Accordingly, the lean angle of the body frame 101 is adjusted. A torque with which the actuator 109 rotates the shock tower 102 with respect to the body frame 101 is adjusted by a control section (not shown). The control section supplies an instruction value to the actuator 109 to thereby adjust a torque to be output by the actuator 109.

Figure 13:
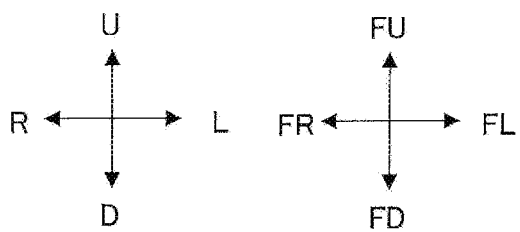
FIG. 13 is a view illustrating another variation of the leaning mechanism.
Figure 13:
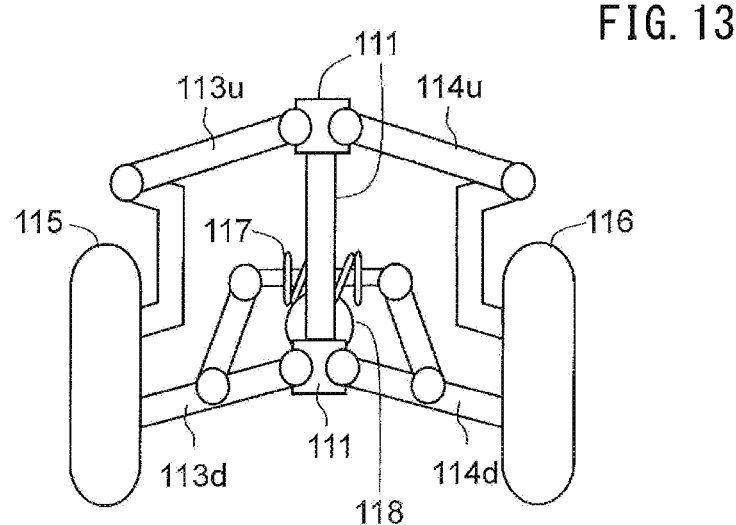

The leaning mechanism may not include the shock tower. FIG. 13 is a view illustrating an example configuration of the leaning mechanism including no shock tower. In the example illustrated in FIG. 13, the leaning mechanism includes a pair of right arms 113u and 113d and a pair of left arms 114u and 114d, as arms that rotate with respect to a body frame 111. The pair of right arms 113u and 113d is rotatably connected to the body frame 111 at one end and rotatably connected to a right front wheel 115 at the other end. The pair of left arms 114u and 114d is rotatably connected to the body frame 111 at one end and rotatably connected to a left front wheel 116 at the other end.

In this case, a suspension 117 is rotatably connected to the arm 113d of the pair of right arms 113u and 113d at one end and is rotatably connected to the arm 114d of the pair of left arms 114u and 114d at the other end.

An actuator 118 applies a rotary force to the right arm 113d and the left arm 114d to thereby adjust rotation of the right arm 113d with respect to the body frame 111 and rotation of the left arm 114d with respect to the body frame 111. In the configuration illustrated in FIG. 13, the suspension 117 is also disposed between the right and left front wheels 115 and 116 and the body frame 111. In this manner, the lean angle of the body frame 111 is adjusted. A torque with which the actuator 118 rotates the right arm 113d and the left arm 114d with respect to the body frame 111 is adjusted by a control section (not shown). The control section supplies an instruction value to the actuator 118 to thereby adjust a torque to be output by the actuator 118.

Figure 14:
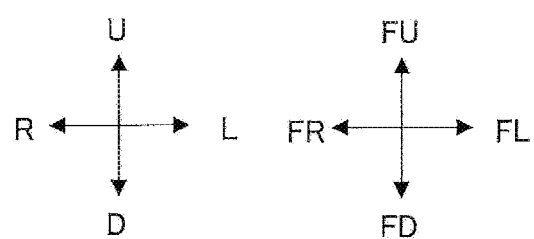
FIG. 14 is a view illustrating yet another variation of the leaning mechanism.
Figure 14:
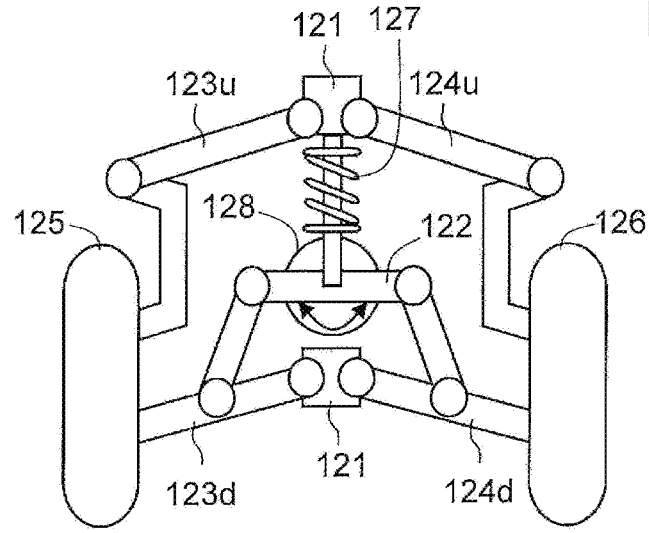

FIG. 14 is a view illustrating another variation of the leaning mechanism. The leaning mechanism illustrated in FIG. 14 includes a pair of right arms 123d and 123u connecting a body frame 121 and a right front wheel 125 to each other and a pair of left arms 124d and 124u connecting the body frame 121 and a left front wheel 126 to each other.

A balancer arm 122 is rotatably connected between the right arm 123d of the pair of right arms 123d and 123u and the left arm 124d of the pair of left arms 124d and 124u. The balancer arm 122 rotatably bridges over the body frame 121 with a suspension 127 interposed therebetween.

An actuator 128 applies a rotary force to the balancer arm 122 to thereby adjust rotation of the balancer arm 122 with respect to the body frame 121. In this manner, the lean angle of the body frame 121 is adjusted. A torque with which the actuator 128 rotates the balancer arm 122 with respect to the body frame 121 is adjusted by a control section (not shown). The control section supplies an instruction value to the actuator 128 to thereby adjust a torque to be output by the actuator 128.

«Other Variations>

The configuration of the actuator is not limited to the example described above. For example, the actuator may be configured to be connected to at least one of the upper arm or the lower arm and adjust rotation of the upper arm or the lower arm to which the actuator is connected. For example, an output member of the actuator may be in an axial shape extending in one direction so that when the output member axially extends or contracts, the output member applies a rotary force to the arm. In this case, the actuator can be configured to include a mechanism that converts rotation of the output shaft of the motor to a motion of the output member in the axial direction (e.g., rack-and-pinion mechanism) with which one end of the output member is rotatably connected to a portion of the arm except for the rotation shaft.

The leaning mechanism can be connected to the right front wheel and the left front wheel through suspensions. As an example, in the configuration illustrated in FIG. 2, the right suspension 33 is located between the leaning mechanism 5 and the right front wheel 31, and the left suspension 35 is located between the leaning mechanism 5 and the left front wheel 32. Arrangement of the suspensions is not limited to this example. For example, suspensions may be disposed in a part of the leaning mechanism. A suspension may be located between the leaning mechanism and the body frame.

The vehicle 1 may include two wheels as rear wheels.

REFERENCE SIGNS LIST

1: vehicle (two front wheel reverse steering leaning vehicle)
21: body frame
23: handle
31: right front wheel
32: left front wheel
4: rear wheel
42: actuator
421: motor
424: control section
424a: instruction value calculator
5: leaning mechanism
51: upper arm (arm)
52: lower arm (arm)
7: steering mechanism (reverse steering mechanism)
74: leaning-responsiveness-adjusting mechanism
79: lean angle sensor

What is claimed is:

1. A two front wheel reverse steering leaning vehicle comprising:
    a body frame that leans in a left direction with respect to a top-bottom direction of the vehicle when the vehicle turns leftward and that leans in a right direction with respect to the top-bottom direction of the vehicle when the vehicle turns rightward;
    a left front wheel and a right front wheel disposed along a left-right direction of the vehicle;
    a rear wheel disposed behind the left front wheel and the right front wheel in the vehicle and supported by the body frame;
    a leaning mechanism including an arm rotatably supported by the body frame and steerably supporting the left front wheel and the right front wheel, the arm being configured to rotate with respect to the body frame so that relative positions of the left front wheel and the right front wheel in a top-bottom direction of the body frame are changed and the body frame is leaned in the left direction or in the right direction;
    a reverse steering mechanism including a handle rotatably supported by the body frame and operable by a rider, the reverse steering mechanism being configured to lean the body frame in the right direction with respect to the top-bottom direction of the vehicle by mechanically transferring leftward rotation of the handle to steer the left front wheel and the right front wheel leftward, and configured to lean the body frame in the left direction with respect to the top-bottom direction of the vehicle by mechanically transferring rightward rotation of the handle to steer the left front wheel and the right front wheel rightward; and
    a leaning-responsiveness-adjusting mechanism including a motor that is connected to the body frame and the arm and applies, to the arm steerably supporting the left front wheel and the right front wheel, a torque in a direction in which the arm rotates with respect to the body frame, the leaning-responsiveness-adjusting mechanism being configured to control the motor by using an instruction value based on a time derivative value of a physical quantity generated by a motion of the rider affecting leaning of the body frame to thereby adjust responsiveness of leaning of the body frame such that leaning of the body frame is caused to track or resist a leaning motion of the rider.

2. The two front wheel reverse steering leaning vehicle according to claim 1, wherein
    the leaning-responsiveness-adjusting mechanism adjusts responsiveness of leaning of the body frame by supplying the motor with an instruction value for changing the torque to be applied to the arm in accordance with the time derivative value of the physical quantity.

3. The two front wheel reverse steering leaning vehicle according to claim 1, wherein
    the time derivative value of the physical quantity is a time derivative value of a lean angle that is a rotation angle of the body frame about a vehicle front-rear axis extending in a front-rear direction of the vehicle.

4. The two front wheel reverse steering leaning vehicle according to claim 3, wherein
    the leaning-responsiveness-adjusting mechanism controls the motor by using an instruction value for increasing the torque in a direction identical to a direction in which the lean angle changes with respect to the top-bottom direction of the vehicle as the time derivative value of the lean angle increases.

5. The two front wheel reverse steering leaning vehicle according to claim 3, wherein
    the leaning-responsiveness-adjusting mechanism controls the motor by using an instruction value for decreasing the torque in a direction identical to a direction in which the lean angle changes with respect to the top-bottom direction of the vehicle as the time derivative value of the lean angle increases.

6. The two front wheel reverse steering leaning vehicle according to claim 1, wherein
    the leaning-responsiveness-adjusting mechanism determines the instruction value such that a relationship between the time derivative value of the physical quantity and a direction or a magnitude of the torque applied by the motor changes depending on a lean angle that is an angle formed by a difference between the top-bottom direction of the body frame and the top-bottom direction of the vehicle.

7. The two front wheel reverse steering leaning vehicle according to claim 1, wherein
    the leaning-responsiveness-adjusting mechanism determines the instruction value such that a relationship between the time derivative value of the physical quantity and a direction or a magnitude of the torque applied by the motor changes depending on a vehicle speed.

8. The two front wheel reverse steering leaning vehicle according to claim 1, wherein
    the leaning-responsiveness-adjusting mechanism determines the instruction value by additionally using a second time derivative value of the physical quantity.

9. The two front wheel reverse steering leaning vehicle according to claim 1, wherein
    the time derivative value of the physical quantity includes a time derivative value of a steering torque generated by an operation of the handle.

10. The two front wheel reverse steering leaning vehicle according to claim 1, further comprising
    a lean angle sensor that detects a lean angle that is an angle formed by a difference between the top-bottom direction of the body frame and the top-bottom direction of the vehicle or detects a time derivative value of the lean angle, wherein
the leaning-responsiveness-adjusting mechanism includes an instruction value calculator that calculates the instruction value based on the time derivative value of the lean angle obtained based on a detection result of the lean angle sensor.

* * * * *